United States Patent [19]

Hausherr

[11] 4,326,772

[45] Apr. 27, 1982

[54] STEREOSCOPIC PICTURE SYSTEM

[76] Inventor: George F. Hausherr, 16 Norwich Ave., Lynbrook, N.Y. 11563

[21] Appl. No.: 116,900

[22] Filed: Jan. 30, 1980

[51] Int. Cl.³ .................. G02B 27/22; G03B 21/00; G03B 35/18
[52] U.S. Cl. ................... 350/134; 352/58; 352/59; 352/239; 353/7
[58] Field of Search ............... 350/130, 132–135; 352/59, 57, 58, 239; 353/7

[56] References Cited

U.S. PATENT DOCUMENTS

| | | | |
|---|---|---|---|
| 1,581,834 | 4/1926 | Bouin | 352/239 |
| 1,642,918 | 9/1927 | Bouin | 352/239 |
| 2,538,124 | 1/1951 | Ramsdell | 350/134 |
| 2,706,429 | 4/1955 | Frankel et al. | 350/134 |
| 2,845,843 | 8/1958 | Lutes | 350/132 |
| 3,050,870 | 8/1962 | Heilig | 350/135 |
| 3,191,493 | 6/1965 | Mainardi et al. | 350/132 |
| 3,722,983 | 3/1973 | Brassington | 350/135 |
| 3,850,505 | 11/1974 | Ratliff, Jr. | 350/133 |
| 3,871,757 | 3/1975 | Glass et al. | 350/134 X |
| 4,146,303 | 3/1979 | Baba | 350/133 X |
| 4,158,480 | 6/1979 | Mitchell | 350/133 |

FOREIGN PATENT DOCUMENTS

| | | | |
|---|---|---|---|
| 218322 | 1/1910 | Fed. Rep. of Germany | 352/239 |
| 732647 | 3/1943 | Fed. Rep. of Germany | 352/59 |
| 623479 | 3/1927 | France | 350/135 |
| 878231 | 9/1942 | France | 353/7 |
| 1109121 | 1/1956 | France | 350/134 |
| 459113 | 8/1950 | Italy | 350/134 |
| 461795 | 2/1951 | Italy | 350/135 |
| 709967 | 6/1954 | United Kingdom | 350/134 |

Primary Examiner—John K. Corbin
Assistant Examiner—Scott J. Sugarman
Attorney, Agent, or Firm—Stonebraker, Shepard & Stephens

[57] ABSTRACT

A stereoscopic picture viewing system having pairs of precisely aligned stereoscopic images arranged in rows on image carriers, with at least two pairs of images on each row, and with one image of each pair located between the two images of a different pair. In one embodiment, the image carriers are circular disks, with the image rows extending radially, and preferably having supplementary key indications at the inner radial ends of each row and in the spaces between the outer ends of successive rows. In another embodiment, the image carriers are long strips of wide film, either still film strips or motion picture film, with the image rows extending transversely across the width of the film strip. A cabinet is provided, for holding two identical image carriers in side-by-side relation, with two binocular viewers on the front wall of the cabinet, so that two persons in side-by-side relation may look through the two viewers and see simultaneously the same stereoscopic views as the two carriers are simultaneously moved to bring successive rows of images to viewing position. Either the binocular viewers or the image carriers are shiftable laterally to determine which of the pairs of images in each row will be aligned with and seen through the binocular viewers. In a variation, the cabinet is larger, accommodating a larger number of people for simultaneous viewing, and with provision for adjustment of the height of the viewers to different eye levels and provision for playing sound reproductions into loud speakers close to the ears of each viewing person. Other variations are disclosed, including a small hand-held viewer, and projectors for projecting images from the image carriers through polarizers onto a viewing screen, where the projected images are observed through polarizing spectacles.

26 Claims, 22 Drawing Figures

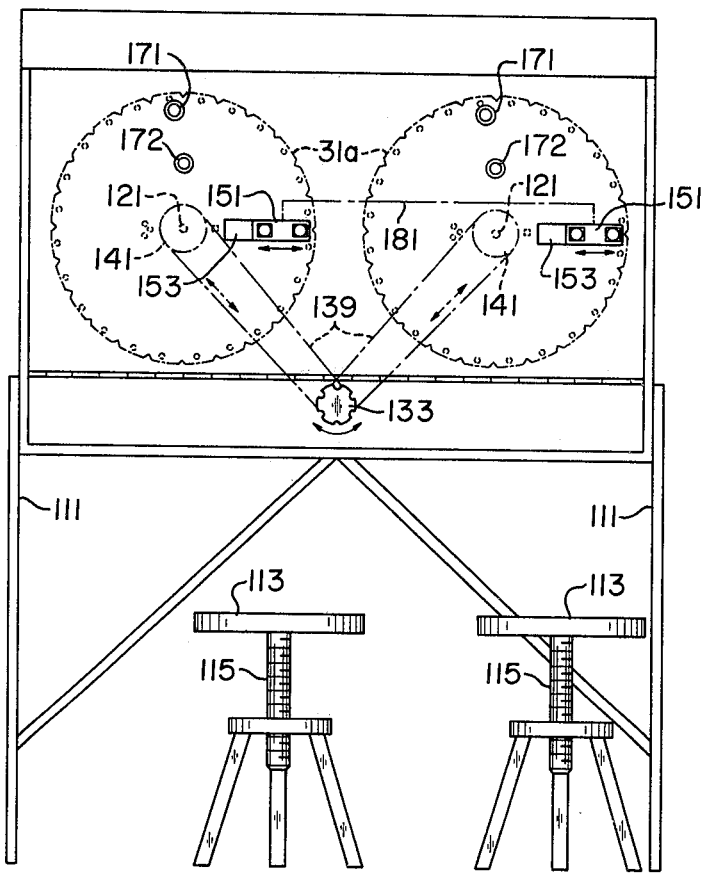
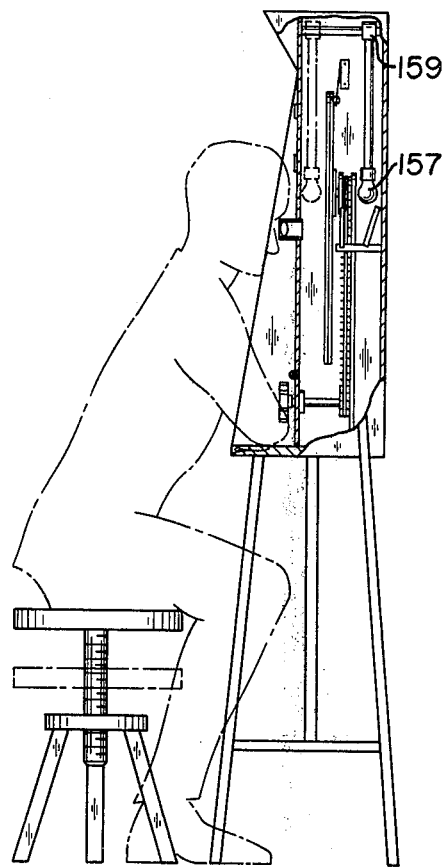
FIG. 5  FIG. 6
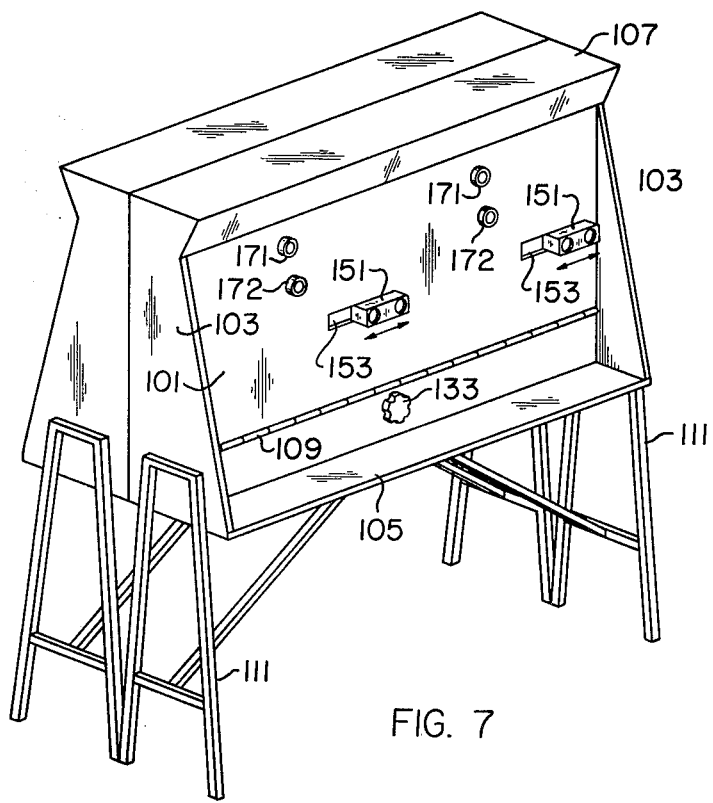
FIG. 7

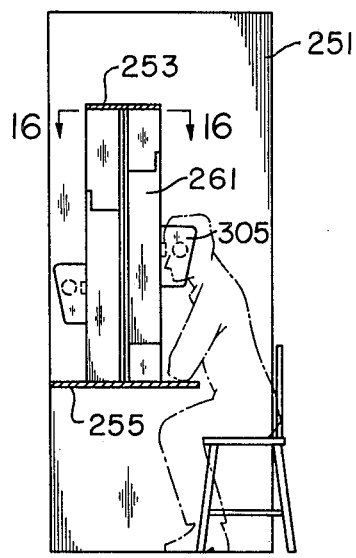
FIG. 15
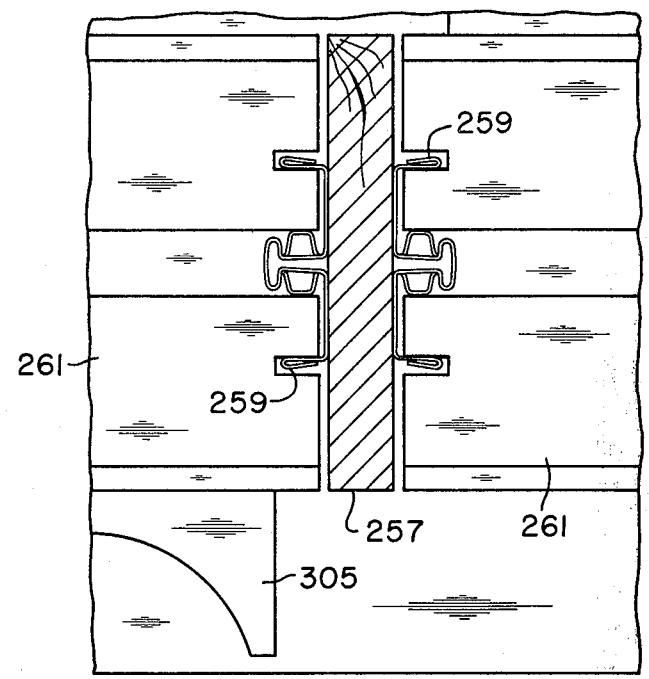
FIG. 16
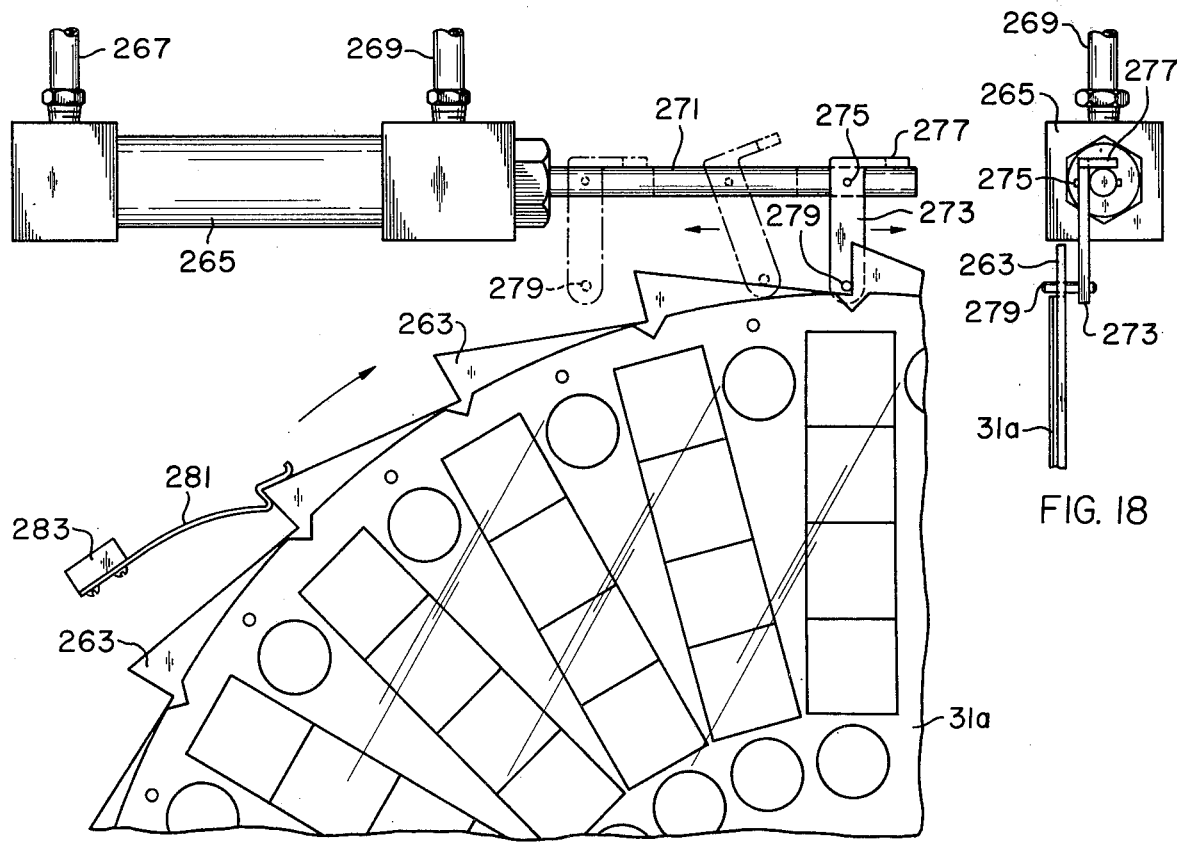
FIG. 17
FIG. 18

STEREOSCOPIC PICTURE SYSTEM

BACKGROUND OF THE INVENTION

This invention relates to a stereoscopic picture system, employing the usual pairs of stereoscopically related images arranged either for direct viewing or for projection onto a viewing screen. Such systems, considered broadly, have been known in the art for many years, but all of the known stereoscopic systems are believed to have drawbacks or disadvantages of one kind or another.

An object of the present invention is to provide an improved stereoscopic system which overcomes at least some of the drawbacks or disadvantages of the prior systems.

Another object of the invention is the provision of stereoscopic image mounting means for grouping the images in a more compact and space-saving manner than has been possible in the prior art.

Another object is the provision of an image mounting system or means of enabling the pairs of stereoscopic images to be very precisely aligned with respect to each other when mass produced at relatively low cost; so that every disk containing transparent sequences may be utilized for (1) direct viewing via binocular lenses; and/or (2) via blown-up projections on rear screens without eye strain or fatigue that previously has occurred from viewing projected stereograms that were not precisely aligned.

Still another object is the provision of means for mounting stereoscopic images in such manner that a series or set of such images may be more easily handled and more easily and quickly viewed (either directly or as projected onto a screen) than in the prior art arrangements.

A further object is the provision of a stereoscopic system particularly useful in sales promotion of high priced items, and arranged so that a pair of viewing persons (e.g., husband and wife) can comfortably and simultaneously view and review duplicate realistic three-dimensional pictures of a variety of things when making a selection for purchase, as for example expensive items of furniture offered by a furniture store, or travel scenes from various tours offered by a travel agency, the system preferably including means for manually controlling the advance from one scene to the next at any time spacing desired by the user, and also enabling reverse movement for reviewing a scene previously observed.

A still further object is the provision of an automatic audio-stereoscopic viewing system adapted for viewing by a considerable number of persons, as for example eight, sixteen, or more persons seeing either the same or different series of changing stereoscopic views from one or another of a series of viewing stations or positions arranged along a cabinet, the scenes being changed at predetermined time intervals by power drive mechanism, such an arrangement being useful both in sales promotion and in providing entertainment or instruction.

Yet another object is the provision of a non-audio stereoscopic "slide film" system especially useful in giving instruction to individual persons, as for example providing at a modest expense a series of stereoscopic illustrations enabling the user to observe repeatedly if necessary, successive illustrations of different maneuver, or of a difficult assembly step in a complicated piece of machinery. The dimensional pictures and captions are seen in a relatively simple and inexpensive hand held viewer designed to facilitate pairs of stereoscopically related images arranged in lines extending transversely or crosswise on a relatively wide strip of film which may be rolled into a roll of indefinite lengths, so that a great many pairs of images may be placed on the roll, the strip having a width, for example, of about 5½ inches.

A further object is the provision of relatively simple and inexpensive forms of projectors for projecting pairs of stereoscopically related images by rear projection onto a translucent screen, from images carried by a circular mounting disk, in one form of projector according to the invention, or from images carried by a wide film strip, according to another form of projector according to the invention, together with means for selectively determining, in either form of projector, which particular pair of stereoscopic images is to be projected from a line containing a plurality of pairs of such images.

In order to fulfil these and other desirable objects, the invention encompasses many different features and aspects. Among the noteworthy aspects of the invention, the following may be mentioned.

(a) The physical or mechanical construction of the holders or carriers on which the stereoscopic images are placed, regardless of the relative positioning of the images.

(b) The positional relationship of the respective stereo images to each other, on the holder or carrier.

(c) The method and means for placing the stereo images on the carrier with such economy of expense as to permit mass production at reasonable cost, and yet with sufficient precision of position to avoid eye strain and possible headache to the viewer, especially during observation of enlarged images projected onto a viewing screen from the images on the carrier.

(d) The construction of a relatively simple and inexpensive solo viewing device for stereoscopic non-audio viewing of successive related pairs of stereoscopic images arranged on a rotary disk, particularly such a device so constructed as to enable the observer to observe pairs of images from a selected one of two different series or groups of images mounted in offset relation to each other on the same carrier disk.

(e) The construction of a manually driven, non-audio viewing device so arranged that two different people in side-by-side relation to each other (e.g., husband and wife who are prospective customers of an establishment) may simultaneously view identical pairs of stereoscopic pictures and captions relating to goods or services offered by the establishment, and preferably so arranged that a salesman may at the same time be informed of the particular picture or scene being viewed at the moment by the prospective customers, in order that the salesman may give the customers additional oral information or explanation, relating to the things being viewed.

(f) The construction of larger and more elaborate audio-stereo viewing devices having a large number of synchronized viewing stations or locations, whereby a large number of seated persons, e.g. ten, 30, 50 or more, may simultaneously view identical pairs of stereograms, and hear related binaural audio presentations. The same stereograms are seen at all of the viewing stations and a tape or record playback controls the shifting to the following stereogram.

(g) The construction of stereoscopic picture viewing cabinets so designed that binocular viewing eyepieces together with the related image carriers are adjustable upwardly and downwardly, to accommodate varying eye levels of different heights of persons seated on fixed height seats during the viewing. When the stereo sequences are to be viewed by standing persons the up and down adjustments are very practical, especially for trade show use.

(h) The construction of an image carrier, either in the form of a disk or in the form of a wide strip of film on which stereoscopically related pairs of images are placed in such precise aligned relation to each other that the images on the carrier may be used either for direct viewing through a binocular device without polarizers, or for projection of images on to a screen (preferably by rear projection on to a translucent screen) where they are viewed by the aid of polarizing spectacles, the precision of placement of the stereoscopically related images being sufficiently accurate so that even protracted screen viewing will not cause eye strain, eye fatigue, or headache.

Much work has been done for many years in connection with stereoscopic pictures and the viewing thereof. Among the prior patents which may be considered pertinent to one or more of the aspects of the present invention, are the following:

| Harlow | 1,957,043 | May 1, 1934 |
| Gruber | 2,189,285 | February 6, 1940 |
| Brost | 2,296,765 | September 22, 1942 |
| Hausherr | 2,365,547 | December 19, 1944 |
| Mast | 2,487,459 | November 8, 1949 |
| Gruber | 2,511,334 | June 13, 1950 |
| Frankel | 2,706,429 | April 19, 1955 |
| Perlin | 2,758,505 | August 14, 1956 |
| Ratliff | 3,850,505 | November 26, 1974 |
| Glass | 3,871,757 | March 18, 1975 |

BRIEF DESCRIPTION OF THE DRAWINGS

FIG. 5 is a front elevational view of a preferred form of viewing cabinet for simultaneous viewing of duplicate stereoscopic views by two persons side-by-side, with provision for a third person, such as a salesman or an instructor, to be informed of the particular views that the two viewers are seeing at any moment;

FIG. 6 is an end elevation view of the viewing cabinet shown in FIG. 5;

FIG. 7 is a perspective view of two such viewing cabinets placed back to back;

FIG. 15 is a vertical section taken approximately on the line 15—15 of FIG. 14;

FIG. 16 is a horizontal section taken approximately on the line 16—16 of FIG. 15;

FIG. 17 is a fragmentary view illustrating the preferred mechanism for advancing the stereoscopic image carrier disks step by step to bring successive pairs of images into view;

FIG. 18 is a fragmentary view of part of the mechanism shown in FIG. 17, viewed at right angles to the direction of FIG. 17;

DESCRIPTION OF THE PREFERRED EMBODIMENTS

Figures 1, 2, 3:
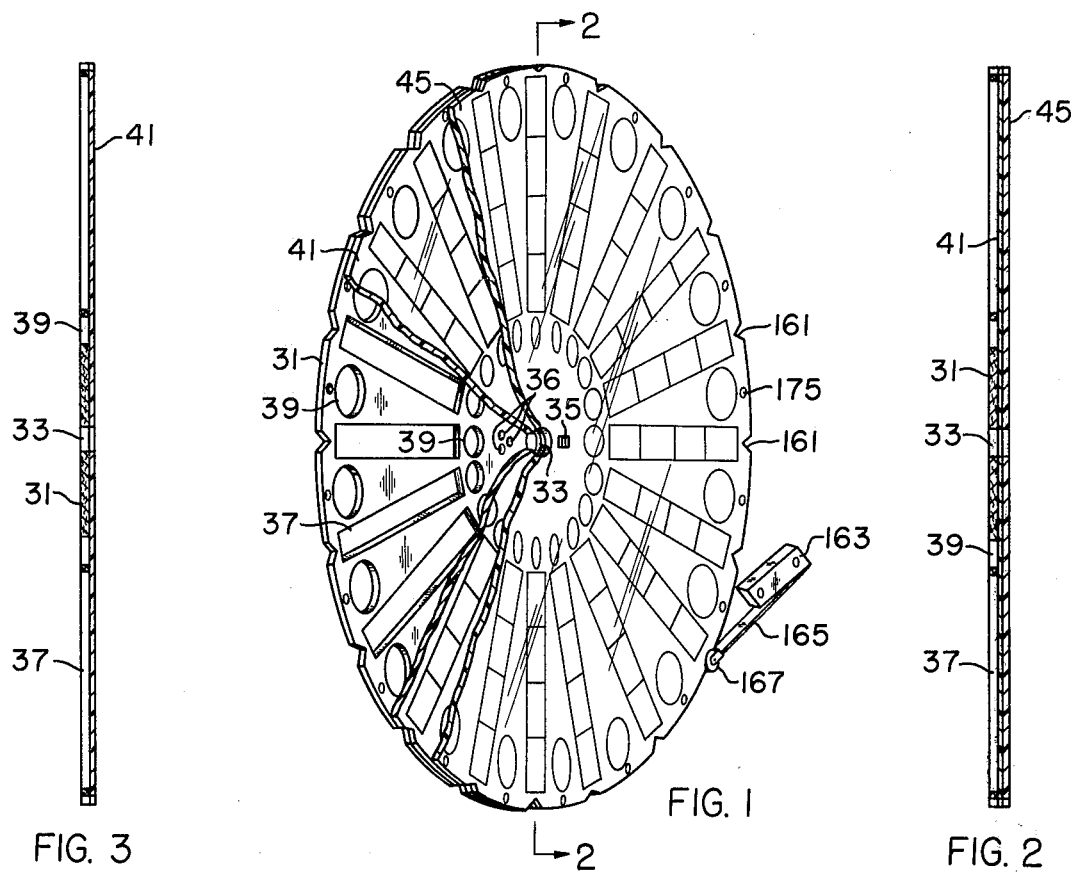
FIG. 1 is a perspective view of a holder or carrier for stereographic images, in the form of a disk according to a preferred embodiment of the invention.
FIG. 2 is a diametrical section through the same, substantially on the line 2—2 of FIG. 1.
FIG. 3 is a view similar to FIG. 2, illustrating a modified construction.

As shown by some of the above mentioned patents, it has been suggested that stereoscopic images be mounted on a holder or carrier in the form of a disk. However, the prior art arrangements, while very satisfactory for some limited purposes, are not really practical from the standpoint of commercial use in sales promotion. The number of pairs of images which it is possible to place on the carrier disks of the prior art is so limited that only a few items could be displayed on any one disk, so that disks would have to be changed frequently during the course of a demonstration. Also, the prior art arrangements are not suitable for simultaneous viewing of duplicate stereoscopic views by two persons, such as husband and wife, who may be jointly trying to decide upon a purchase of an expensive item. If a practical and efficient system for showing duplicate realistic stereoscopic or three-dimensional pictures to two people simultaneously were available at moderate cost, it is believed it would be a great boon to various commercial organizations such as travel agencies who could thus show prospective purchasers realistic pictures of the highlights of various different tours in order to interest the viewers in the tours and help them in making a selection, or to a furniture store dealing in high grade and expensive furniture which might perhaps not be conveniently accessible on the display floor but which could be shown to advantage to a husband and wife by means of realistic stereoscopic pictures, at least for the purpose of making a preliminary tentative selection.

It is with such purposes in mind that the stereoscopic system of the present invention has been developed, going far beyond anything contemplated in the prior art so far as known to the present inventor.

In order to be practical, and to avoid frequent changes of the carriers or holders of the stereoscopic images during a particular demonstration or sales pitch, the carrier or holder must contain a considerable number of pairs of stereoscopic images. According to the present invention this is done not only by increasing the diameter of the disk, but by arranging the images on the disk in a special and novel way which it is believed has not been previously contemplated.

According to the invention, the stereoscopic images are arranged along radial lines on a rotary disk, and with two pairs of stereoscopically related images on each radial line. This is a basic departure from the customary and widely commercialized arrangement where the right and left images are arranged diametrically on opposite sides of the center of rotation of the disk, as in the Gruber U.S. Pat. Nos. 2,189,285 and 2,511,334, and is also a departure from the arrangement shown in the present applicant's U.S. Pat. No. 2,365,547 where the right and left images are both arranged on the same radial line, on the same side of the center of rotation, but where there is only one pair of stereoscopically related images on each radial line.

Figure 4:
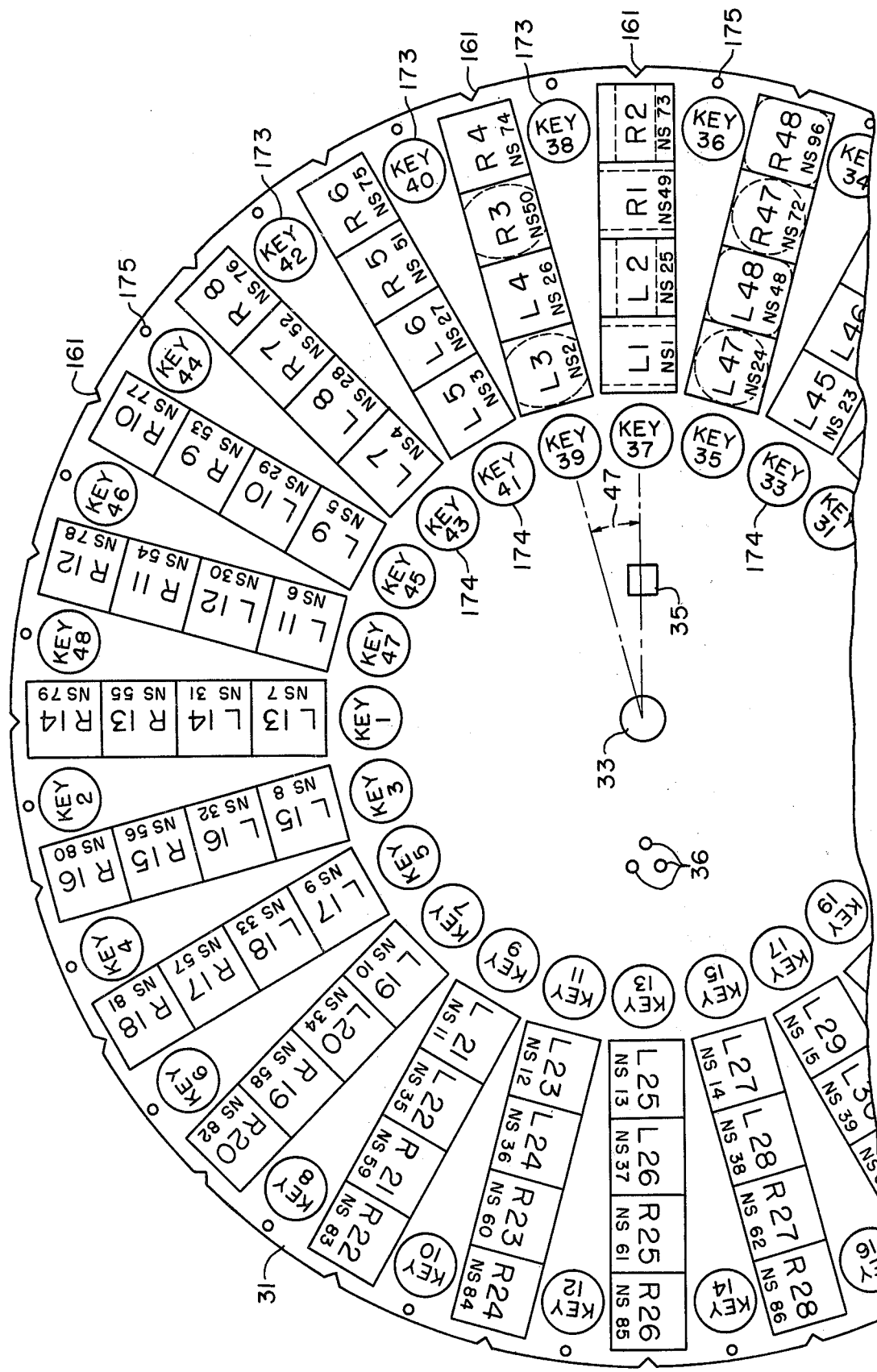
FIG. 4 is a face view of a fragment of the disk, illustrating in greater detail the arrangement of the stereoscopic images and other parts.

Referring now to FIGS. 1, 2, and 4, the holder or carrier disk according to the present invention comprises a main body of stiff cardboard 31 with a central arbor hole 33 and, at some radial distance from this hole, a driving pin receiving opening 35 on one side of the arbor hole and a cluster of three small holes 36 on the opposite side of the arbor hole. Suitably mounted on this cardboard base are the stereoscopic pictures or images, arranged as further detailed below. The pictures may be opaque, to be viewed by reflected light when illuminated from the front, or transparencies, to be viewed when illuminated from the rear as well understood in the art of viewing transparencies. If the pictures are opaque, the base or cardboard body 31 need not be apertured or cut out except for the arbor hole 33 and hole 35. However, when the pictures to be viewed are transparencies, which is the more usual case and normally preferred, the cardboard is cut away at the areas underlying the picture areas, as indicated for example at 37, FIG. 1, and is also cut away at other areas 39 known as key areas, as further explained below. Some of these key areas are located between the radial strips of picture images, near their outer ends, and other key areas are at the inner ends of the radial strips of picture areas, as illustrated in FIG. 1. They will be further described and explained in connection with the more detailed description of the completed disk with reference to FIG. 4.

On top of the cardboard thus prepared, there is mounted the photographic image carrier, preferably in the form of a sheet of opaque paper or transparent film as the case may be, indicated at 41. One of the features of the present invention is that instead of mounting the picture images as individual images on the cardboard disk, or even as individual pre-prepared radial strips, the images are all on the single sheet or membrane 41 (of paper or film, as the case may be) which is reproduced from a very carefully and accurately prepared master sheet, where great care has been taken to get the images at exactly the right spacing and orientation with respect to each other. It is found that even slight errors in spacing of the images of a stereoscopic pair with respect to each other, or a slight angular turning of one image relative to its sister image of the same pair, may cause eye strain and fatigue in the observer, when viewing enlarged pairs of images projected onto a screen through polarizing filters and viewed through polarizing spectacles, and may lead to headache.

This is avoided, according to the present invention, by anchoring the original photographic images with great care and precision on a single master sheet, of glass or other dimensionally stable transparent material. These images accurately placed on this master sheet are, for example, pictures of size $2\frac{1}{4} \times 2\frac{1}{4}$ inches, or larger, although frames from 35 mm. film could be used. Then from this master sheet as many full size prints or copies as desired by optical projection printing to a reduced size, for making up the desired number of the sheets 41 to be placed on the cardboard disks 31 to form the completed stereoscopic disks for distribution, for example, to furniture stores carrying a particular brand of furniture illustrated in the stereoscopic views, or distribution to travel agencies representing a particular wholesaler of travel plans who prepared the disks for his retail agents, and so on. Thus if sufficient care is taken in the initial lay-out of the images when making the master, to achieve proper spacing and proper orientation, it is assured that the duplicate sheets or films or membranes reproduced from the master will all have the images properly aligned relative to each other, avoiding all danger of variation of images relative to each other which would be so likely to occur if individual images were individually placed and mounted on the cardboard base.

The above described method of producing the image carrying sheet 41 by optical projection printing at reduced size from a carefully prepared master which includes all the separate images which are to go on the entire disk, is a very advantageous method, and is applicable alike to production of disks on which the images are transparencies and those on which the images are opaque, since the opaque images start initially from photographic negatives which are suitable for projection printing onto photographic print paper.

In mass producing the disks, a slightly different procedure is used when the image sheet 41 is opaque, than that used when it is transparent. In either case, the images are projection printed from the master sheet onto the image sheet 41 preferably while the latter is in the form of a square sheet of proper dimensions to cover the diameter of the final disk to be produced. If disks having a diameter of 21 inches are to be produced, for example, then the images are projection printed from the master onto square sheets of 21" on each side, the sheets being black and white print paper or color print paper for producing opaque disks, or transparent film (black and white or color, as desired) for producing transparency disks to be viewed in back lighted cabinets or to be viewed by projection. They are fully processed (developed, fixed, and dried) before being mounted on the cardboard or other base sheet material.

In the case of the opaque image sheet, the square sheet is then laminated to a square sheet of the desired base material, such as cardboard, of the same dimensions, which can be a plain unperforated sheet. Then it is die-cut in a single operation to the desired circular shape, with the desired edge notches, with the central arbor hole 33, with the drive pin hole 35, and with the indexing holes 175 if these are desired. In making these disks for opaque pictures, it is not necessary to provide the rectangular openings 37 nor the key openings 39, 173, and 174, nor the cluster of special holes 36. Therefore it is not necessary to do any die-cutting of the cardboard base sheet before the image bearing sheet 41 is laminated to it, as all the die-cutting can be done after the image bearing sheet is applied to the cardboard or other base sheet material. If a protective overlay sheet is used on top of the image bearing sheet, it is applied, of course, before the die-cutting is performed.

When the disk is to carry transparencies, however, then much of the die-cutting must be performed before the image carrying sheet 41 is applied to the base sheet. Therefore, a square base sheet is first die-cut to provide the rectangular openings 37 through which light will reach the stereoscopic transparencies during the viewing or projection operation, and also the key openings 39, 173, and 174 must be formed before the image sheet 41 is applied. The arbor hole 33, drive pin opening 35, and cluster of holes 36 may be formed in the base sheet before the image sheet is applied or may be formed later. The same is true of the indexing holes or control holes 175 near the edge.

Then the image sheet 41, in the form of a square piece of transparent film (either black and white or color, as desired) with the images already printed thereon from the master, is accurately placed on the square base sheet. Because they are both square and of the same size, it is easy to line up the edges of the two squares (base and film sheet) accurately with each other, to produce correct register. When these sheets have been laminated to each other, along with any desired protective overlay sheet, a final die-cutting operation is performed, to cut the circular peripheral edge of the disk, with the edge notches, and to form the holes 175 if they were not previously formed in the earlier die-cutting operation. The formation of some or all of the holes 33, 35, and 36 may be deferred until this final die-cutting operation if desired, thus forming these holes simultaneously in the base sheet, the image sheet 41, and the overlay sheet, if any. If these holes 33, 35, and 36 are formed in the base sheet during the first cutting of the base sheet, before the image sheet 41 is applied, then similar holes must be formed in the image sheet 41 (and in any overlay sheet) after it is applied to the base, or else the entire central section of the image sheet (and overlay sheet, if any) may be cut out in one large opening or hole, before it is applied to the base.

The overlying or protective sheet 45 may be a clear transparent sheet, either flexible or preferably of rigid plastic material to give added strength and stiffness to the complete disk. In either case, whether flexible or rigid, it may be opal or light defusing instead of completely clear. Also, the overlying protective sheet may be a duplicate cardboard sheet just like the original base sheet to which the image bearing sheet 41 is first applied, the second or overlying cardboard sheet having the same cut-out openings 37, 39, 33, 35, 36, etc. If a second cardboard sheet is used, it will serve to strengthen or stiffen the disk and make the total assembly somewhat thicker, but will not provide an actual layer or film over the images.

It has been mentioned that cardboard is the preferred material for the base sheet, as it is cheap and readily available. However, the base sheet may be of plastic sheeting having approximately the same stiffness as cardboard, or even stiffer and/or thicker, if desired.

With regard to the spacing and arrangement of the stereo images, it is found that for the educational and commercial applications for which the present invention is mainly although not exclusively intended, it is desirable that each of the stereoscopic images have a size of about 1¼ inches square, rather than the much smaller size which has become common in hand-held viewers for casual entertainment purposes, and it is also desirable that each disk hold about 48 pairs of stereoscopic images to provide on a single disk a sufficient number of views to display a reasonable selection of merchandise, artifacts, dioramas, habitats, etc., without having to change the disk. As already mentioned, the preferred construction according to the invention has two pairs of stereoscopic images on each radial line, so that if there are to be 48 pairs of images, 24 radial lines of images will be required, which means that the radial lines of images will be at an angular spacing of 15 degrees from each other, this angle of 15 degrees being indicated at 47 in FIG. 4. If the inner ends of each radial strip of images are very close, practically touching the inner ends of the next adjacent radial strips on either side, a circle at the inner ends of the radial strips will therefore have a circumference of about 30 inches, or let us say a diameter of about 9.6 inches. Since each of the radial strips of images is 5 inches long (four images each 1¼ inches square) it follows that a circle around the outer ends of the radial strips of images will have a diameter of about 19.6 inches, and the disk itself may have a total diameter of, say, 21 inches, to allow adequate space for the edge notches mentioned below.

These dimensions are given as typical examples for a preferred and satisfactory construction, and are not intended as critical limitations. The size of the image may vary, within the limits, for example, of 1 inch square to 1½ inches square, although the preferred size of 1¼ inches has been found most suitable as a happy balance between a size large enough to show good detail in the picture and yet small enough to allow a desirable number of stereoscopic pairs to be placed on a carrier disk of moderate and easily handled size.

The novel arrangement of the stereoscopic images on the disk is indicated in FIG. 4. Starting for example with the radial line which passes through the hole 35 for receiving the orienting pin, this radial line has two pairs of stereoscopic images or pictures respectively marked, for convenience of understanding, as L1, L2, R1, and R2. L1 and R1 are the left and right pictures or images, respectively, of the first pair. L2 and R2 are the respective left and right images of the second pair. It will be noted that one image of another pair is always located between the two related images of one pair. That is, the images L1 and R1 of the first pair are separated from each other by the image L2 of the second pair, and the images L2 and R2 of the second pair are separated from each other by the image R1 of the first pair.

Now the next radial line, counter-clockwise from the first mentioned line, contains two more pairs of images, similarly arranged, and here designated as L3, L4, R3, and R4. It is seen that here also, the same rule applies, each pair of images being separated from each other by one image of a different pair.

The next radial line in a counter-clockwise direction contains the images designated L5, L6, R5, and R6, arranged in the same manner already mentioned. This arrangement is followed throughout the entire disk.

The stereoscopic images on other radial lines are similarly arranged, but only fragmentarily shown in FIG. 4, because the images on the few radial lines that are completely shown will serve adequately to indicate the arrangement where the images are not completely shown. The arrangement continues around the entire circumference, radial line by radial line, until the starting point or initially mentioned radial line is reached. The last radial line of images before getting back to the starting line is the one with the images marked L47, L48, R47 and R48.

As already indicated, the exact number of radial lines depends on the dimensions chosen for the stereoscopic images and the diameter chosen for the disk, and these factors determine the angular spacing of each radial line of images from the next radial line. As already mentioned, if there are to be 48 pairs of stereoscopic images, which is a convenient size in practice, then the angular interval between successive radial lines will be 15 degrees, which is the angular spacing shown in FIG. 4. But if only 40 pairs of stereoscopic images are to be used instead of 48, then only 20 radial lines are needed, and the angular spacing from each radial line to the next would be 18 degrees instead of 15 degrees, thus enabling the diameter of the disk to be somewhat smaller, for the same size of stereoscopic image. A greater or lesser number of radial lines of pairs of images may be used, within the scope of the invention, but in general about 40 to 48 pairs of images, arranged on 20 to 24 radial lines, is found to be most suitable for purposes of the present invention.

While the laminated construction, using a transparent protective sheet 45 as described in connection with FIG. 2, is the preferred construction, it is not essential to use such a protective sheet. A modified construction as illustrated in FIG. 3, showing a disk having the same cardboard base 31 to which is applied the same sheet 41 carrying the images, but in this modified construction the transparent protective layer is omitted.

It will be understood, of course, that the designations L1, L2, R1, R2, etc., used in the drawings and this description do not actually appear in the finished product. They are merely designations used for convenience of description, to indicate where the respective images of a stereoscopic pair of images are placed on the disk or holder, in accordance with the present invention.

There are many ways in which the disks or image holders described in connection with FIGS. 1–4 can be used. One of the features of the present invention is to use them in apparatus designed for simultaneous viewing by two persons, as for example by a husband and wife who are viewing stereoscopic pictures of expensive items of furniture or jewelry or scenes from a proposed tour, preparatory to making a decision on purchasing articles or taking a tour; or an instructor and a student, simultaneously viewing stereoscopic pictures of some article or event about which the instructor is teaching the student or about which the instructor is conducting an oral examination of the student; or simultaneous viewing of stereoscopic pictures by two colleagues, such as two scientists or two doctors, who wish to discuss a matter with each other as they examine successive views, without the distraction of having to pass a conventional stereoscopic viewer back and forth from one person to the other. For such uses, an advantageous form of apparatus is that shown in FIGS. 5–8, to which reference will now be made.

An upright body has a casing or housing with a front wall 101, end walls 103, bottom wall 105, and a top wall 107. An upper portion of the front wall is hinged by a piano hinge 109 (FIG. 8) to a stationary lower section of the front wall, so that it may be swung forwardly and downwardly to obtain easy access to the interior for removal and replacement of the image carrying disks. Legs 111 with suitable braces hold the body at a suitable elevation for viewing the stereoscopic images through eyepieces (further mentioned below) at the eye level of persons seated on suitable adjustable seats such as the stools 113 adjustable in height as by means of threaded seatposts 115, so that people of different body heights can adjust these stools to bring their respective eye levels to the viewing eyepieces.

Figure 8:
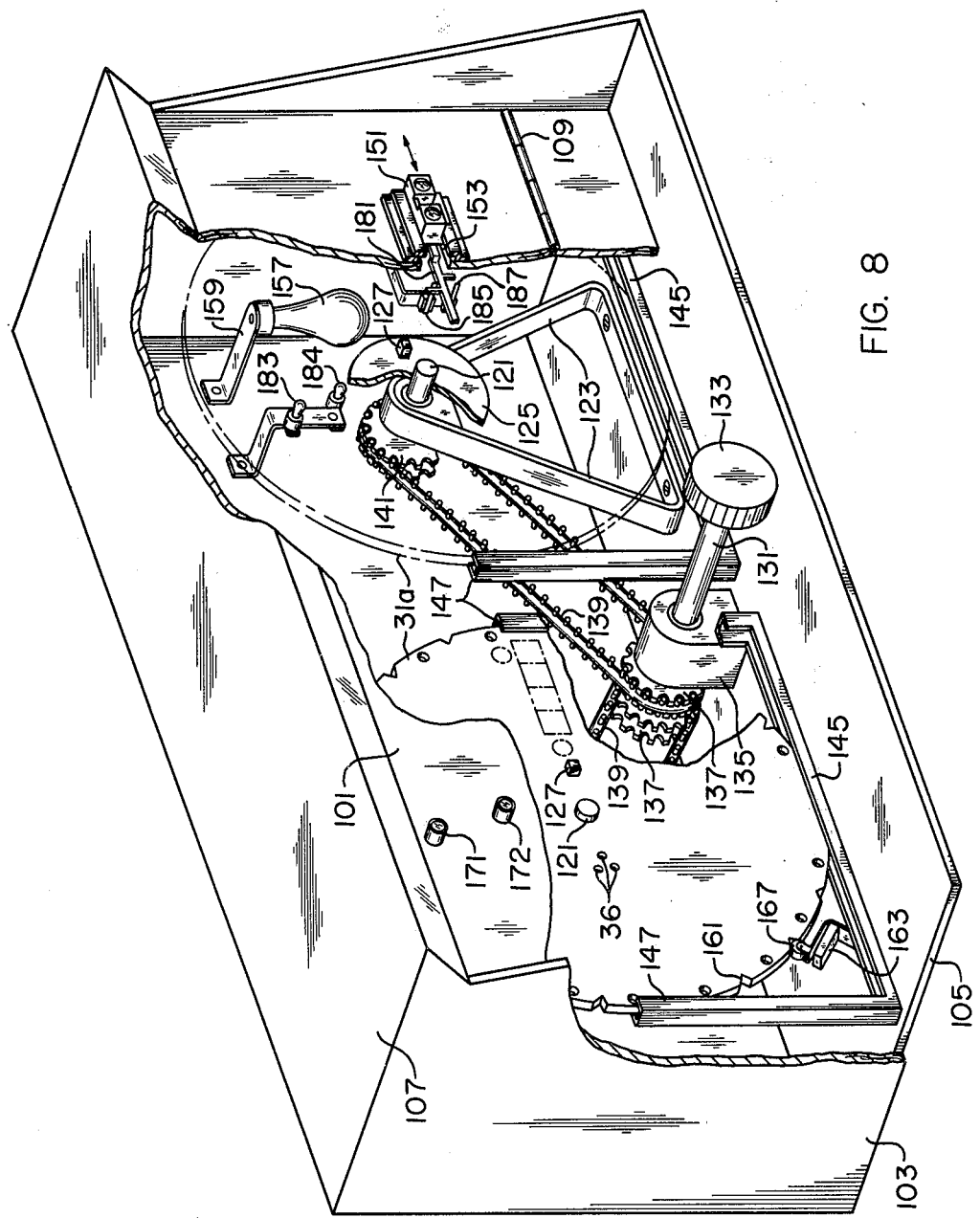
FIG. 8 is a perspective view, with parts broken away, of the same viewing cabinet, illustrating certain features of the interior construction.

Within the cabinet or housing are two parallel shafts 121 laterally separated from each other and rotatable in conventional bearings, each held by any suitable or convenient bracket, the details of which are not important for purposes of the present invention. A simple triangular bracket 123, resting on and secured to the bottom wall 105 of the cabinet, is shown in FIG. 8 as a convenient example. Secured to and rotating with each of these shafts 121 is a hub member 125, the front face of which is spaced a little rearwardly from the front end of the shaft so that the front end of the shaft provides an arbor for projecting through the arbor hole 33 of the image carrier or disk 31 to center the disk and give it adequate support. The hub member 125 has a square orienting pin 127 projecting forwardly from it, which enters the square orienting hole 35 of the disk 31 when the disk is impaled on the arbor or shaft 121 and moved rearwardly to a position flat against the front face of the hub member. Of course the disk must be turned one way or the other until the orienting hole 35 lines up with the pin 127.

Duplicate image holders or disks, indicated in general at 31a in FIGS. 5 and 8, are mounted on the two shafts 121. The two shafts are rotated in synchronism, to bring the duplicate sets of stereoscopic images simultaneously into viewing position by the two persons using the equipment, by any suitable mechanism for rotating both shafts 121 in synchronism with each other. For example, there may be a manually operable shaft 131 projecting out of the front wall of the housing near the bottom thereof and having a manually operable knob 133 by which it may be turned. This shaft 131 turns in a conventional bearing 135 fixed to the bottom wall, and has two sprockets 137 driving two chains or non-slip belts 139 which in turn drive sprockets 141 on the respective disk shafts 121. When the parts are first assembled, care is taken to orient the hubs 125 on the two shafts in the same way, and they will remain properly oriented relative to each other because of the non-slip character of the driving connections 139 and the sprockets 137 and 141. Therefore it is assured that when any particular radial line of images on one disk is opposite the viewing eyepieces associated with that disk, the corresponding radial line of duplicate images on the duplicate image disk will be opposite the viewing eyepieces associated with the other disk.

If desired, one may rely on a tight frictional fit of the arbor 121 in the arbor hole 33 and the orienting pin 127 in the orienting hole 35 for keeping each disk in proper position on the hub. However, it is preferred to use other means for assuring that the disk will remain on the hub and not come loose during rotation. The preferred retaining means is in the form of channel members for loosely embracing the peripheral edges of the disk, as illustrated in FIG. 8. There is a channel member 145 extending horizontally on the bottom wall of the cabinet, in position to receive the bottom edge of each disk, and channel members 147 rising from the ends of the bottom channel 145, extending upwardly to approximately the same elevation as the shafts 121.

When inserting or removing stereoscopic disks from the housing, the top section of the front wall 101 being open on its piano hinge 109, the disks can be dropped down into the channels 147 and between the channels each disk can be slightly sprung forward so that the lower part of the disk will safely pass by the projecting ends of the arbor shaft 121 and locating or orienting pin 127. The shaft and the pin project only a relatively slight distance forwardly from the plane of the front face of the hub 125, so only a very slight amount of springing of the disk is necessary. This is most easily accomplished when the hubs are turned (by manipulating the knob 133) so that the locating pins 127 are vertically above the shaft.

When the duplicate stereoscopic disks are mounted in the described manner on the respective arbor shafts, the stereoscopic images are viewed through binocular eyepieces 151 mounted on the front wall 101 of the cabinet or housing, these being mounted for limited horizontal movement in a lateral direction in short tracks or guideways 153. These binocular eyepieces contain lenses of conventional kind. The persons using this equipment place their eyes to the eyepieces, as indicated in FIG. 6. By means of the lenses in the eyepieces (which may be adjustable for focusing, like the adjustment of conventional binoculars, in case the eye sight of the user is not perfect) the user sees enlarged images of the matched pair of stereoscopic pictures which are aligned with the eyepiece through which he is looking. The person sitting next to him will see the same pictures, assuming that duplicate stereoscopic disks have been properly mounted on the two shafts.

When the eyepiece 151 is at the righthand end of its track or guideway 153, it will be aligned with the right and left images or pictures of what may be called the outer ring or group of pictures on the disk. That is, the eyes of the observer looking through the eyepiece in this position will see the pictures schematically indicated in FIG. 4 at L2 and R2, if this particular radial line of pictures is in viewing position, or at L4 and R4 if the next radial line is in viewing position, and so on. This righthand position of the eyepiece is the position illustrated in FIGS. 5, 7, and 8. Now if the eyepiece is shifted to the leftward limit of its track or guideway 153, the viewer will see the pictures of the inner circle or group, such as pictures L1 and R1, or L3 and R3, and so on. It is entirely possible, of course, to view both sets of pictures on one radial line before moving to the next radial line, then turn the knob 133 to bring the next radial line into viewing position and move the eyepieces to view both sets of pictures on this radial line, then proceed to the next radial line, and so forth. But this is not the preferred way of using the equipment. It would involve constant and undesirable movement of the eyepieces back and forth. It is preferred, therefore, to arrange the pictures on the disk in logical sequence so that all of the pictures of one ring (say for example the outer ring or group) will be successively viewed, and then when the disks have been turned through a complete revolution, the eyepieces are moved only once to the other position and all of the pictures of the other ring or group are viewed in succession. This preferred method of operation requires only one lateral shifting of the eyepieces for each complete revolution of the disk, rather than shifting the eyepieces for each separate radial line of the disk.

The illumination provided will depend upon whether the pictures on the disks are transparencies, which must be illuminated from the rear, or are opaque pictures, to be illuminated from the front. FIG. 6 shows schematically an adjustable light source such as a bulb 157 mounted on a bracket 159. If transparencies are used, the light source 157 will be behind the disk. If opaque pictures are used, the light source will be in front of the disk but out of the line of sight of the eyepiece.

A feature which is preferred is to have the light extinguished during rotation of the disks, and come on again only when the disks reach the exact position for viewing. This avoids the eye strain caused by having a brightly illuminated picture moving in relatively close proximity to the eye of the observer. Preferably the periphery of the disk is notched as at 161 (FIGS. 1 and 8) opposite each radial line of pictures. A switch 163 has an operating arm 165 (FIG. 1) provided with a roller 167 (FIGS. 1 and 8) which rides on the periphery of the disk as it turns, and drops into the notches 161 as they successively arrive at the roller. The switch 163 is wired in series with the light source within the cabinet. The switch is so arranged that it is closed when the roller drops into a notch, and is open when the roller is not in a notch. In this way, the light illuminating the picture is lit only when the picture is in proper alignment with the eyepiece, and goes off during the rotary movement to bring the next picture to the eyepiece, coming on again when the next picture is properly aligned with the eyepiece.

This arrangement not only saves eye strain, but also provides a visual indication to the user, as he turns the knob 133, that he has turned far enough to bring the next picture to viewing position. Moreover, in addition to the visual indication, there is an indication by the sense of feel, since the roller 167 dropping into the notch acts as a resilient detent tending to stop the rotation of the disk at the proper point and tending to hold the disk at that point, resisting rotation in either direction until a substantial degree of force is exerted on the knob 133.

Another valuable feature of this embodiment of the invention is the provision of means so that the third person may be kept informed of exactly what pictures are being observed by the two persons sitting side by side at the cabinet. Thus, for example, if a husband and wife are seated at the cabinet turning the knob to look at successive pictures of expensive furniture, the invention provides means whereby a salesman standing beside them may inform himself of which pictures are viewing at any particular moment, and thus can make appropriate "sales pitch" comments to them regarding the articles shown in the pictures they are seeing at that moment.

This is accomplished by providing the disk with what may be called "key" indications, and providing the cabinet or housing with an observation opening or peephole through which the "key" indication may be seen by the salesman or other third person involved, in a way which will not disturb or require displacement of the two principal viewers.

In order to avoid interference with the persons looking through the binocular viewers 151, the key observation openings or peepholes are located some distance away from the binocular eyepieces 151, and preferably vertically above the shafts 121, in the locations 171 and 172. These observation openings 171 and 172 may be provided for one or both of the disks 31a. If they are provided for only one, it is preferably for the left hand disk, so that the third person (e.g., a salesman) can conveniently stand to the left of the left hand one of the two people seated and looking through the binocular eyepieces, and can observe the key indications on the left-hand disk, to see exactly which pictures or images the two seated people are observing at the moment.

These observation openings or peepholes 171 and 172 are located at the proper radial distance from the shaft 121 so that they line up with the key markings or indications 173 and 174 on the disk, which key markings or indications are placed in an outer series or ring 173 in the wedge shaped or triangular spaces between successive radial rows of stereoscopic images, and in an inner series or ring 174 at the inner ends of the radial rows of stereoscopic images, as indicated in FIG. 4. The outer circle of key indications 173 is in line with and observed through the observation opening 171. The inner circle of key indications 174 is observed through the other observation opening 172.

The indicia marked on these key locations 173 and 174 can be of any desired kind that will appraise the observing person with the information desired. It may be a non-stereo miniature reproduction of one of the pictures of the two related stereoscopic pictures which are at that moment aligned with and observed through the eyepieces 151, or it may be a word or words which will remind the observer of the subject matter of the stereoscopic pictures which are at that moment aligned with the eyepieces 151, or it may be simply a number, in which case the observer (if he has not memorized the particulars) will refer to a list which he holds in his hand, to see what stereoscopic pictures are identified by that number. Whatever indicia or reminder information is placed on the "key" area, the area is preferably illuminated synchronously with the illumination of the stereoscopic pictures.

In any case, regardless of the character of the key markings or indicia, it must be realized that they are offset angularly from the stereoscopic pictures or images to which they relate, because the respective observation positions 151 and 171-172 are offset angularly from each other. Assuming that the observation openings 171, 172 are angularly spaced approximately 90 degrees from the binocular eyepieces 151, then the key indications 173 and 174 on the disk itself must be similarly spaced angularly approximately 90 degrees from the stereoscopic pictures to which they relate. But if the stereoscopic pictures are arranged in radial lines spaced 15 degrees apart, as in the example shown in FIG. 4, the key markings 173 of the outer circle cannot be at 90 degrees exactly, because an angle of 90 degrees from any one radial line of stereoscopic pictures would be right in the middle of another line of stereoscopic pictures. So the angular offset of the peepholes 171 from the stereoscopic observation openings, if the radial lines of stereoscopic pictures are 15 degrees apart, can be for example, 82½ degrees, or 97½ degrees. But the angular offset of the other peepholes 172 for observing the inner circle of "key" areas 174 can be exactly 90 degrees. Naturally, it must be determined in advance just where the key markings are to be placed with respect to the stereoscopic pictures to which they refer, and then the observation openings 171 and 172 in the front wall of the cabinet must be placed in accordance with the angular displacement which has been decided upon, for the disks.

To insure that the two persons using the binocular eyepieces are looking at the same stereoscopic pictures, and to avoid the possibility that one eyepiece 151 may be in its righthand position while the other is in its left-hand position looking at a different picture on the same radial line, it is desirable to connect the two eyepieces by a simple mechanical linkage so that they both move together. Such a linkage is indicated schematically at 181 in FIG. 5. If one of the eyepieces 151 is moved to the left, the linkage will carry the other eyepiece to the left with it, and vice versa.

As a further practical refinement, it may be desirable to ensure that a third person, using peepholes 171 and 172, sees only the proper key indications and does not become confused by seeing the wrong key indication. This can be achieved simply by using two separate lights 183 and 184 for illuminating respectively the outer and inner series of key indications, and controlling these lights by two separate switches 185 and 187, respectively coupled to the linkage 181. When the dual coupled binocular lenses are in their right hand position, the switch 185 will light the bulbs 183 to illuminate the key indications of the outer series, seen through the peepholes 171. Shifting the binocular lenses 151 to their left hand position will, via the linkage 181, open the switch 185 and close the switch 187 to light up bulbs 184 to illuminate the key indications of the inner series seen through the peepholes 172. If desired the respective lights may light up and go dark in synchronism with the turning of the disk, by being wired in series with the switch 163 controlled by the edge notches 161.

It will be noted from FIG. 7 that these cabinets are so constructed that they may be placed back to back. This is a convenient arrangement for some stores or other establishments, so that one couple may sit on one side of the back to back assembly, looking at the stereoscopic disks which have been placed in this cabinet, and another couple can sit on the opposite side of the assembly, looking at the pictures on other stereoscopic disks placed in the other cabinet, while a single salesman moves back and forth from one side to the other, looking into the peepholes from time to time and making appropriate comments to his potential customers regarding the articles seen in the various pictures which they are viewing from time to time. This same arrangement is valuable also for instructional purposes, where four students may be seated at the two cabinets arranged back to back, and a single instructor may move back and forth from one side to the other, answering questions and looking in the peepholes to see how far the students have progressed in viewing and analyzing a series or sequence of instructional stereoscopic pictures.

Figure 9:
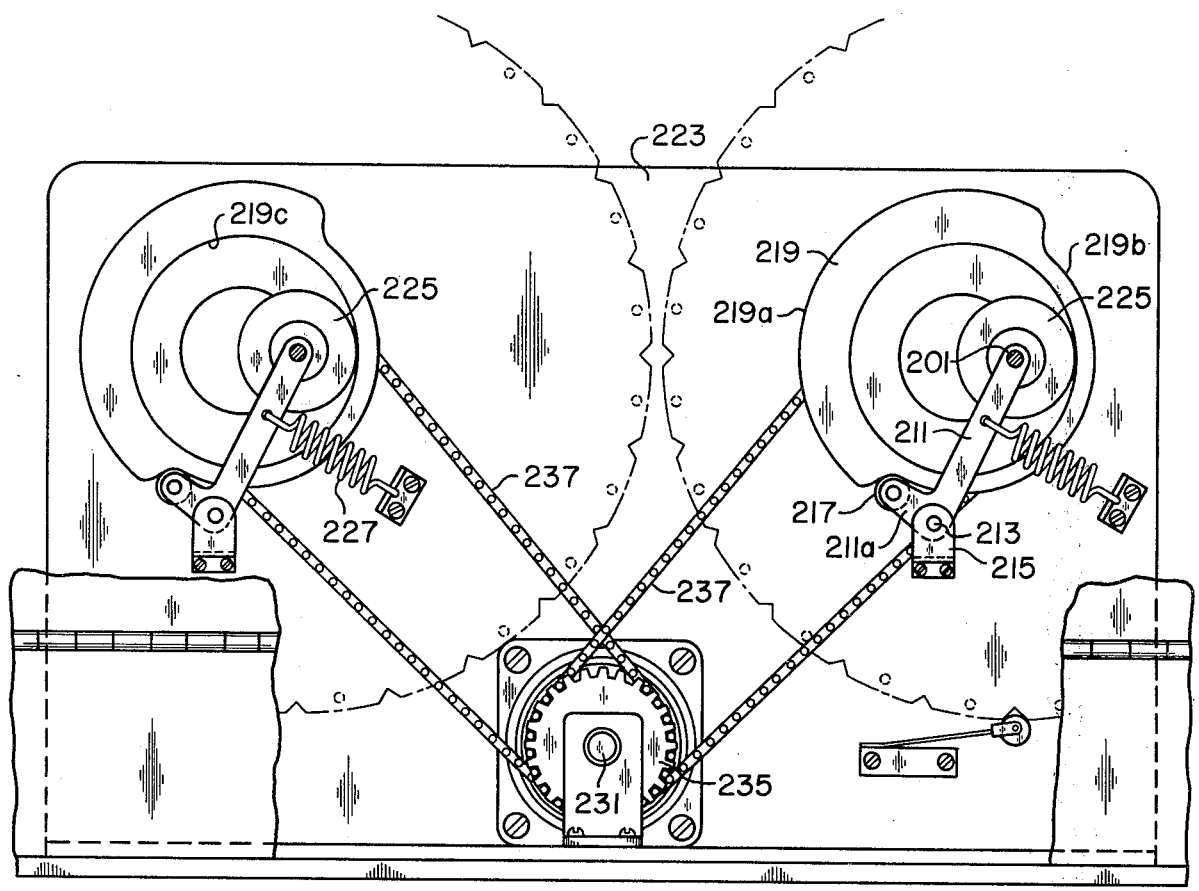
FIG. 9 is a view of the shifting mechanism for an alternative construction where the axes of rotation of the disks are shifted laterally to determine which series of stereoscopic images on the disks are to be viewed, rather than shifting laterally the binocular viewing eyepieces as in the previous embodiments.
Figure 10:
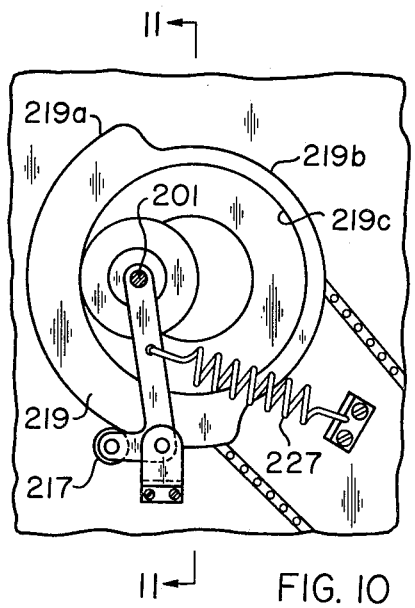
FIG. 10 is a view similar to a fragment of FIG. 9, illustrating the rotary axis of one disk shifted from the position of FIG. 9 to the alternate position.
Figure 11:
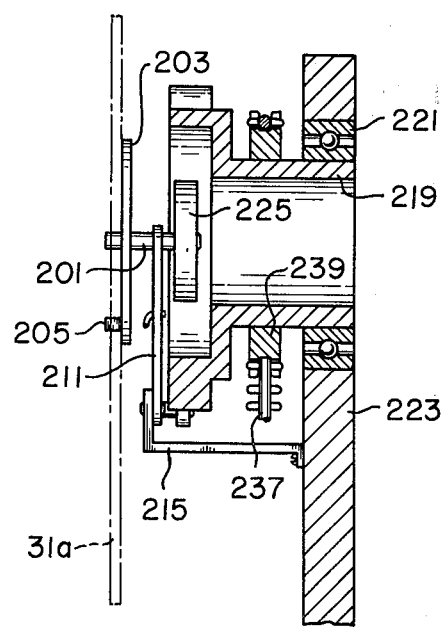
FIG. 11 is a section taken approximately on the line 11—11 of FIG. 10.

The preferred arrangement for enabling the viewer to view selectively either one of the two sets or rings of stereoscopic pictures on the disk is to have the viewing eyepieces moved radially toward and away from the center of the disk, as described in connection with FIGS. 5–8. However, it is within the scope of the invention to reverse this arrangement, keeping the eyepieces stationary and moving the arbor shaft of each disk laterally toward or away from the stationary eyepiece. Such an arrangement will now be described with reference to FIGS. 9–11.

In this modified arrangement, the arbor shaft 201 and its hub 203 and locating pin or orienting pin 205 are like the arbor shaft 121 and hub 125 and pin 127 of the previous embodiment, except that the shaft, instead of being mounted in a stationary bearing, is mounted to rotate in a bearing at the end of a bell crank lever 211 pivoted at 213 on a fixed bracket 215. A second and shorter arm 211a of the bell crank lever carries a follower roller 217 which rides on the periphery of a cam member 219 which has a high portion 219a and a low portion 219b, each occupying approximately one half of the circumference, with a transition slope between them. This same cam member 219 also has an internal cam portion 219c which is cylindrical and concentric with the axis of rotation of the cam. The cam rotates in a ballbearing 221 on a fixed member 223 which is conveniently the rear wall member of the cabinet or housing.

The shaft 201 carries the above mentioned hub 203 at its forward end, in front of the bell crank lever 211 on which it is mounted. The rear end of the shaft projects rearwardly beyond the bell crank lever, into the space within the cam portion 219c, and this rear end is provided with a wheel 225 fixed to the shaft. A tension spring 227 having one end connected to the bell crank lever 211 and the other end connected to a fixed bracket tends to move the bell crank in a clockwise direction on its pivot 213, to tend to hold the wheel 225 engaged tightly with the righthand side of the cylindrical cam portion 219c. This is the position illustrated in FIG. 9. At this time the follower roller 217 is riding on the low portion 219b of the peripheral or external cam. Now if the cam is turned so that the follower roller rides up the slope and onto the high portion 219a of the cam, as in FIG. 10, this will swing the bell crank lever against the tension of the spring 227 so that the shaft 201 will be shifted to the left from the position shown in FIG. 9 to the position shown in FIG. 10, bringing the wheel 225 into engagement with the left edge of the internal cam 219c. A high friction or anti-slip coating is preferably provided on the internal surface of the cam 219c and the external surface of the wheel 225, so that whenever the cam turns, it will drive the wheel with it.

For manual unidirectional turning of the two cams simultaneously, there is a shaft 231 (similar to shaft 131) extending out through the front wall of the duo viewing cabinet, and a control knob (not shown) similar to the knob 133 in the previous manual bidirectional embodiment. This knob drives two sprockets 235 that are fixed to the shaft 231, and they actuate two transmission members 237 of a suitable non-slip kind, such as notched belts, toothed belts, or chains, and these in turn go to sprockets 239 on the respective cam members 219.

For the manual drive the two duplicate disks bearing captions are mounted side by side on the two shafts 201, similarly to the mounting of the duplicate disks on shafts 121 in the previous embodiment. Persons viewing the stereoscopic pictures use the manual knob on the shaft 231 to bring successive pictures unidirectionally on successive radial lines into alignment with the viewing eye pieces.

To convert the above described manual, unidirectional procedure to fully automatic audio stereoscopic presentations one unidirectional "positioning" or stepping motor will drive the two cams and shift the pairs of stereo disks. An amplifier, pairs of speakers, and tape playbacks will provide sound, and timing to shift the dimensional pictures from stage to stage. With both the manual and automatic audio stereo arrangements the binocular eye pieces on the front wall of the housings are in a fixed position.

As turning of the shaft 231 is continued, whether manually or by a stepping motor, a point is reached where the two follower rollers 217 of the two bell cranks simultaneously ride up the slope from the low cam portion 219b to the high cam portion 219a, or ride down the slope from the high portion to the low portion, as the case may be. In either event, this shifts the bell cranks from one position to the other, that is, from the FIG. 9 position to the FIG. 10 position, or from the FIG. 10 position to the FIG. 9 position, and thus shifts the shafts 201 laterally. Hence if the outer ring or set of stereoscopic pictures was previously aligned with the eyepieces, this shift of the shafts 201 will bring the other or inner ring or set of stereoscopic pictures opposite the eyepieces, or vice versa. Turning of the shaft is continued, and the stereoscopic pictures of the second ring or set are successively viewed. The turning of the shafts 201 and consequent turning of the disks is caused by the driving relation between the wheels 225 and the surface of the cam 219c, and the above mentioned use of a non-skid or non-slip coating on these parts ensures that the two duplicate disks will not get out of phase with each other.

In some cases a merchant may wish to let his customer see only the stereoscopic pictures on the outer ring or set of pictures without seeing those on the inner ring or set, or vice versa. In the form of construction illustrated in FIGS. 5–8, a simple conventional lock may be provided to prevent movement of the viewing eyepieces from one position to the other, so that the customer can look at only the particular set or ring of pictures determined by the proprietor. In the form of construction illustrated in FIGS. 9–11, this may be accomplished by providing a lockable and releasable stop mechanism of conventional construction, confining the rotation of the cam member 219 to half a revolution, and enabling the proprietor to select either half of the revolution he may wish, blocking the other half. This does not interfere with full or complete revolution of the disk carrying the stereoscopic images, since the shafts 201 revolve through two complete revolutions for each single revolution of the cam members 219. The diameter of the wheels 225 is one half the diameter of the circular cam surface 219c on which they ride.

Another embodiment of the invention is illustrated in FIGS. 12–18. This embodiment is suitable for use either in entertainment or in sales promotion, especially in places frequented by the public such as air terminals, bus terminals, shopping malls, etc. In this form of the invention now to be described, a larger number of viewers (ten in this illustrated embodiment) simultaneously see the same stereoscopic pictures and hear either recorded music or a recorded talk appropriate to the pictures. All of the picture disks are simultaneously rotated automatically at timed intervals, and the viewer has no control over the sequence or timing.

In the preferred form of this construction, the cabinet includes two upright pedestals 251 carrying illuminated posters or other pictorial matter for attracting attention. These pedestals form the ends of the structure, and are connected to each other by a bridge-like web including longitudinal top and bottom members 253 and 255 respectively. Upright partitions 257 extend crosswise between the members 253 and 255. Mounted for upward and downward sliding movement between the partitions, on suitable guideways or tracks indicated schematically at 259, are the box-like units 261, each containing an arbor shaft and hub and locating or orienting pin, similar to those elements in FIG. 8. In this case, however, the hub is made of larger diameter, a little larger than the diameter of the disk which carries the stereoscopic images, and the periphery of the hub is provided with teeth 263 (FIG. 17) spaced at the same interval as the angular spacing of one radial row of stereoscopic pictures from the next radial row.

For turning the disks to bring successive radial rows of stereoscopic pictures in line with the binocular viewing eyepieces, each of these mechanism boxes 261 is provided with a pneumatic cylinder 265 having inlet and outlet connections 267 and 269, and having a piston rod 271 to which a flipper 273 is pivoted at 275. An angular part 277 on the flipper overrides the piston rod and limits the extent to which it can turn in a clockwise direction on its pivot 275, but does not prevent it from turning counter-clockwise on its pivot, as illustrated in broken lines in FIG. 17.

Assuming that the piston is at the left end of its stroke, now if compressed air is admitted through the connection 267, the piston rod will be moved to the right, and the lateral pin 279 on the depending portion of the flipper or kicker 273 will engage against the radial surface of a tooth 263 and will move the hub clockwise through the space of one tooth, at which point a resilient detent 281 snaps over a tooth to hold the hub against retrograde movement. This resilient detent 281 preferably is operatively connected to an electric switch 283 which controls the illumination of the pictures on the disk (which can be either front or back illumination, depending on whether the pictures are opaque or transparencies) in the same manner that the previously described switch mechanism 163, 165 turns the illumination off during the movement of the disk. In this instance, the dropping of the detent 281 off of the end of the tooth with which it was engaged, when the pneumatic cylinder begins to turn the hub and disk, turns the light off, and the light comes on again when the detent 281 becomes properly seated on the next tooth.

Each of these mechanism boxes 261 also has, in addition to the hub for holding the stereoscopic disk and the pneumatic cylinder arrangement for turning the hub, a binocular viewing eyepiece 301, and a pair of earphones 303 mounted in wings projecting outwardly in position to be in close proximity to the sides of the head of a person having his eyes at the eyepieces 301. The eyepieces 301 and the wings 305 containing the earphones 303 are preferably formed as a unit mounted in a short horizontal track on the front wall of the box 261, for lateral horizontal movement through a short distance (about an inch and a quarter) so as to bring the eyepiece in line, selectively, with either the outer ring of stereoscopic pairs of pictures on the disk, or the inner ring of such pictures. However, this movement is preferably not under the control of the viewer, but is under the control only of the proprietor of the establishment, and a lock of any conventional kind is provided for each of these laterally movable assemblies, to lock them in the position selected by the management, so as to view only the outer ring of pictures on the disk, or only the inner ring, as the case may be.

Figure 12:
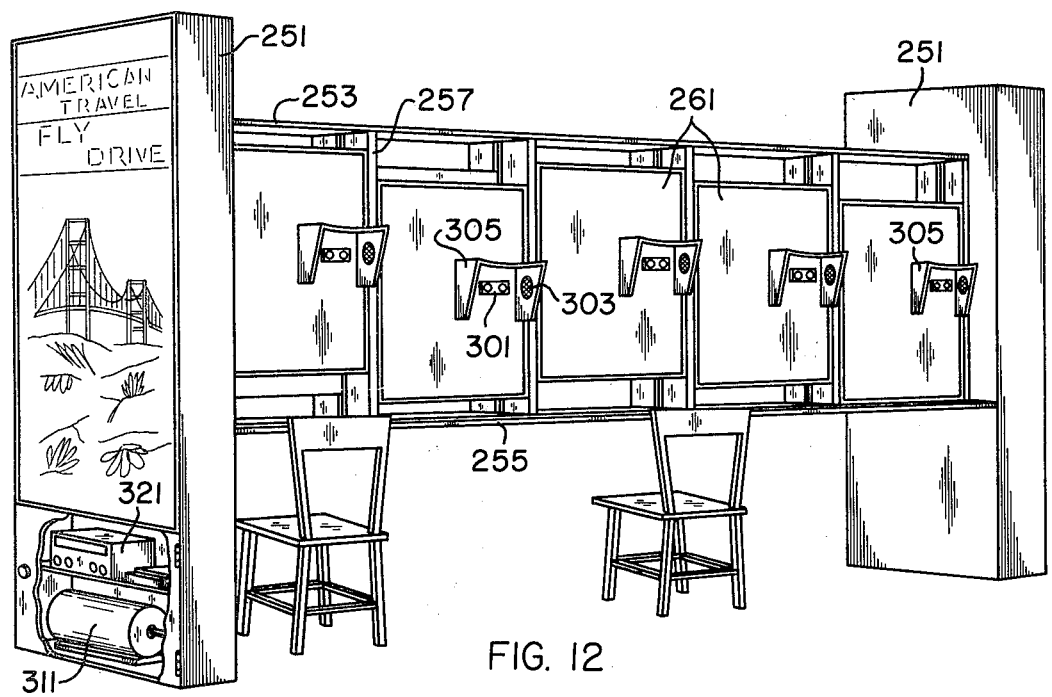
FIG. 12 is a perspective view of a stereoscopic viewing device for viewing by a larger number of people, in this instance by five persons on one side of the cabinet and five persons on the other side of the cabinet.
Figure 13:
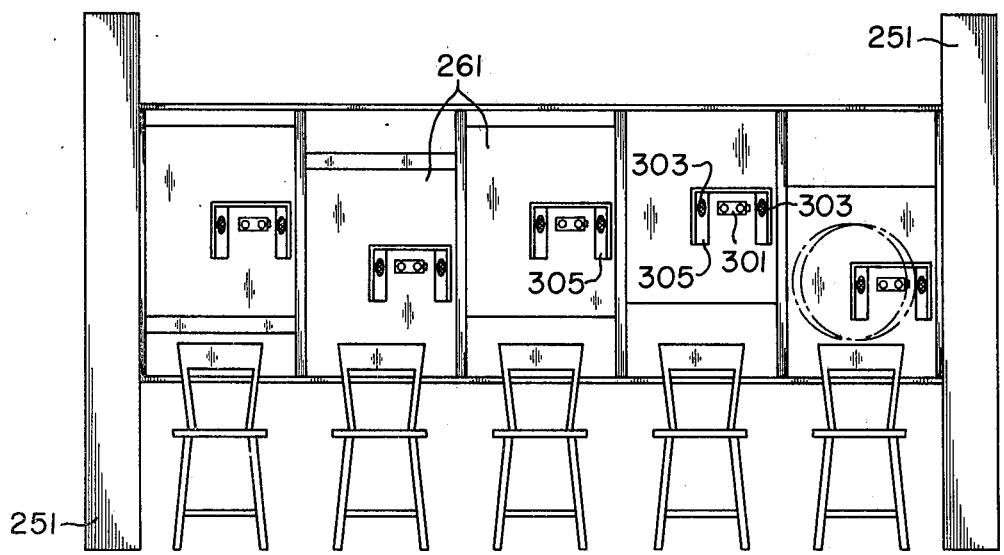
FIG. 13 is a front elevational view of the construction shown in FIG. 12.

In one of the end pedestals 251, such as the left hand pedestal viewed in FIG. 12, there is a supply cylinder 311 of compressed air, leading through conventional timing mechanism of known form (not shown) to flexible hoses supplying air to the inlets 267 and 269 of the pneumatic cylinders 265 in all of the respective mechanism boxes 261. This automatic timing mechanism, at suitable predetermined intervals, supplies compressed air to the connections 267 at the rear ends of all of the cylinders 265, advancing the piston rods to turn all of the disks in all of the boxes through one space, simultaneously exhausting air from the other connection 267, of course, and shortly theraftter the timing mechanism exhausts air from each connection 267 and supplies air to each connection 269 to retract the pistons back to their starting position, ready for the next forward stroke. During this backward movement, the flipper or kicker 273 swings counter-clockwise on its pivot 275 as indicated in broken lines, so as to clear the tooth of the hub, and then when it clears this tooth it swings down again to its normal effective position, as illustrated.

Also in one of the pedestals 251, there is preferably a magnetic tape player or phonograph disk player, with amplifier, indicated schematically at 321, electrically connected by flexible wiring connections to the earphones 303 of all of the separate mechanism boxes or viewing stations. Thus each person having his eyes at the binocular viewing eyepieces hears the appropriate sounds issuing from the binaural earphones 303 close to his ears, so these sounds can be relatively soft and will not be heard at a distance from the installation. The sounds can be in the form of a talk or lecture or salespitch relating to the pictures being shown stereoscopically, or can be in the form of music.

The mounting of these individual back-to-back mechanism cabinets for upward and downward sliding movements, like sliding window sash, is an important feature permitting the stereo pictures to be viewed in comfort by people of varying heights. Fixed height stools or chairs may be provided as illustrated, in which case the seated user will move the binocular lenses up or down to their most comfortable viewing location. For many trade show programs and other merchandising needs the flexible upward and downward feature can be incorporated into clients' display presentations to permit prospects to stand while viewing the stereograms. In some cases manual shifting of the disks that carry captions will be practical for the standees.

Figure 14:
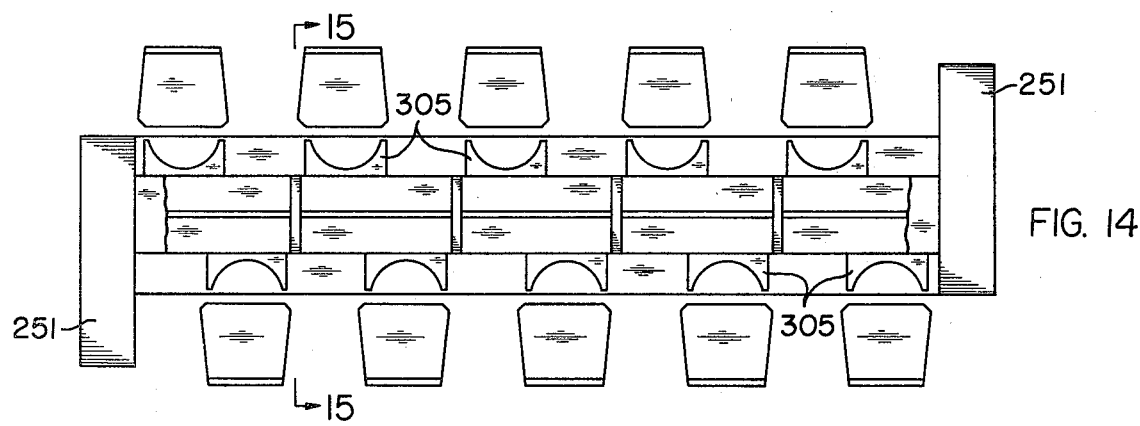
FIG. 14 is a top plan view thereof.

From the plan view shown in FIG. 14, it will be seen that in this particular illustrated embodiment, there are five viewing positions on one side of the bridge-like structure and five positions on the other side, so that ten people at a time can use an installation of this kind. The novelty of such an installation is sure to excite interest, in a public place, making it likely that people may even wait in line for a viewing position to become available, when all are occupied. This would be, for example, an excellent way for an airline to show pictures of available air tours, at an installation of this kind set up in a waiting room of an air terminal.

With regard to the locking of the shifting movement of the eyepieces so that only one set of stereoscopic pictures on the disk can be seen, even though two sets of pictures are on the disk, it should be explained that this is for the purpose of enabling the program to be varied from time to time with the least effort on the part of the management, but of course the management can use the apparatus in a different way if desired. Assume, for example, that twenty-four different stereoscopic pictures are sufficient for a particular desired program, but the disk holds 48 pairs of stereoscopic pictures, 24 in an inner ring and 24 in an outer ring. It will be easier and less expensive for the management to make up two separate programs and place them on the disks at the same time. Then the disks are placed in the various mechanism boxes 261 (ten identical disks in the ten boxes) and the viewing eyepieces are all placed and locked in their righthand positions or lefthand positions as the case may be, depending on which program the management wishes to show. The appropriate music or talk tape is placed in the sound mechanism 321, and the machine is turned on.

After the program has run for a desired length of time, say for example one week, the management may decide to show the other program, already provided on the same disks. Because the program is already on the disks, it is not necessary at this time to remove the disks from the apparatus, but it is only required to unlock the viewing eyepieces and shift each of them to their other position and lock them again, this being a very simple procedure taking only a few seconds. Then the music or talk tape in the sound mechanism 321 is changed to provide sounds appropriate to the new program, and the apparatus is ready to go again. This is much simpler than if one had to change all of the disks, every time that a program was to be changed.

There may be times when it may be desired to use the disk mounting arrangement for ordinary flat or non-stereo pictures. This is indicated in FIG. 4 by the use of the letters NS (standing for "non-stereo") followed by a number. Since the particular disk illustrated as an example in FIG. 4 has space for 48 pairs of stereo pictures, there are a total of 96 picture areas, and if flat pictures rather than stereo pairs are to be used, it is apparent that 96 flat pictures or non-stereo pictures can be placed on the disk. These non-stereo indications in FIG. 4 are given merely to show a possibility of use of the disk, and they do not represent the preferred use thereof. However, for training or instruction purposes, there may be times when a larger number of "flat" or non-stereo pictures would be more important than a smaller number of stereographic pictures, and then the flat or non-stereographic pictures can be mounted on the disk. They are preferably viewed by projecting successive individual pictures onto a screen (rear projection ordinarily being used) and observing the enlarged image on the screen, no polarizing filters or spectacles being needed.

The non-stereo disks are produced by the same method used in producing stereo disks; that is, an accurate master is prepared, preferably of somewhat enlarged size with relation to the desired size of the final disk. Then the carrier sheets 41 carrying the final images are produced by optical projection and reduction from the master, and are mounted on the disk bodies 31 of cardboard or other desired base material, and a final cover sheet 45 is added if desired, or omitted if preferred, and the final die-cutting is performed. The key indications 39, 173, 174 are omitted on the "flat" or non-stereo disks.

The arrangement of stereographic pairs of images on rotary disks is the preferred arrangement. However, certain aspects of the invention are applicable also to wide strips of film, without the use of a disk. For example, referring now to FIG. 19, stereo pairs may be arranged cross-wise on a film strip 351 approximately 5 inches wide, containing successive rows with two pairs of stereoscopic images on each row. The arrangement would be the same as in any one of the radial rows in FIG. 4. That is, each row extending crosswise of the film in FIG. 19 contains the left image of a first scene, then the left image of a second scene, then the right image of the first scene, and then the right image of the second scene, just as in FIG. 4. If these images each are about 1¼ inches square (the preferred size as described in connection with FIG. 4) then they can be accommodated on a film strip five inches wide, or say about 5½ inches wide to play safe and leave a little margin at the edges.

The film may be fed down from a supply roll 353, past a binocular viewing eyepiece 355 having provision, such as a lever 357, for interocular (interpupillary) adjustment. The eyepiece 355 is mounted for rightward or leftward of about 1¼ inches along a track 358 to align the eyepieces with the stereoscopic views of the first set (first and third picture areas from the left) or with the stereoscopic views of the second set (second and fourth from the left). There may also be a focusing adjustment 359. The transport of the film is accomplished by manually turning the knob 361 of the take-up roll 363.

When all of the film has been fed down, looking at, for example, the first set of stereoscopic pictures, then the lenses of the eyepiece are shifted laterally by moving them rightwardly along the track 358, and the direction of feed of the film is reversed, now using the bottom roll 363 as the supply roll and operating the knob 365 of the top roll 353 to utilize it as the take-up roll, and the stereoscopic pictures of the second set are examined successively as the film strip is moved upward step by step. Alternatively, the film strip may first be completely rewound, and then the second set of stereograms may be viewed while the strip is fed downwardly again rather than during the upward rewinding movement.

This is a very simple and inexpensive construction. A simple web 367 has forwardly extending arms or brackets to hold the upper and lower spools and to support the body 369 on which the binocular eyepiece is mounted. This body may contain an electric light for illuminating the film from the rear (assuming that the pictures are transparencies) or the rear end of the body may be open so that the user holds it toward the light and obtains merely natural illumination for the film.

Figures 19, 20:
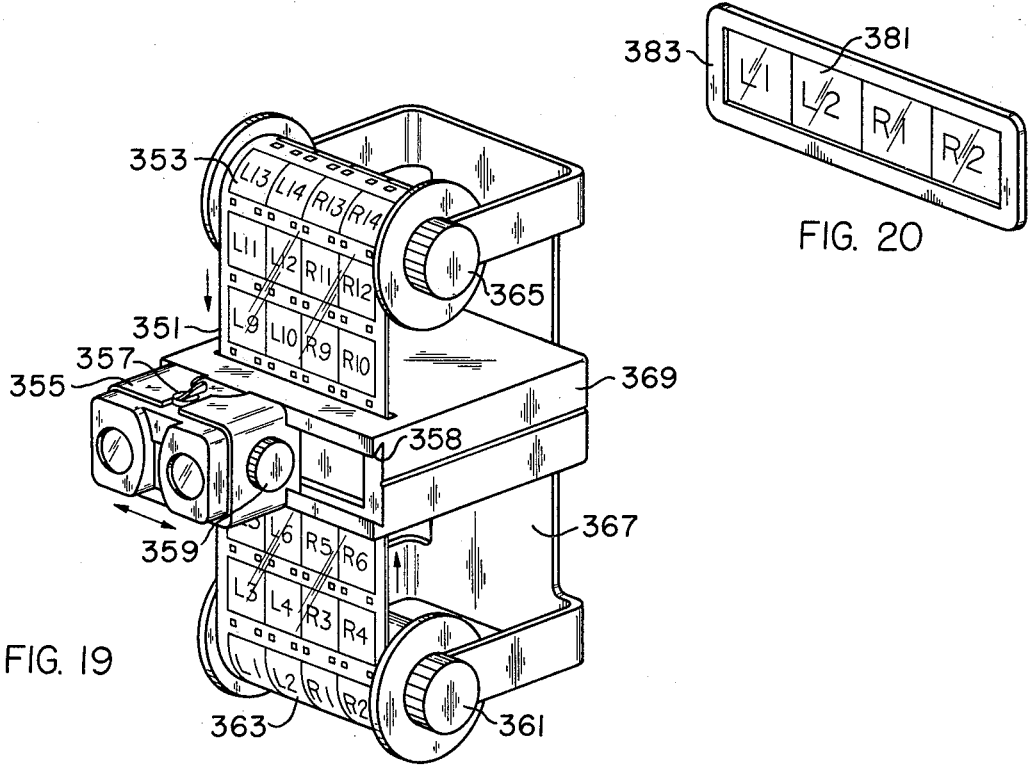
FIG. 19 is a perspective view of a device for viewing stereoscopic images arranged laterally on a long roll of wide film.
FIG. 20 is a perspective view of a stereoscopic slide containing two pairs of stereoscopic images.

In FIG. 20 is shown a stereoscopic slide 381 in a mount 383 suitable for placement in a stereoscopic projector or a hand viewer. This slide has four images, arranged like those on the film strip (FIG. 19) and like those on any given radial line of the disk (FIG. 4) so that the two companion pictures of one view are separated from each by one of the pictures of the other view on the same slide. That is, as explained in connection with the disk of FIG. 4, the images L1 and R1 of the first stereoscopic scene are separated by the image L2 of the second scene, and the two related stereoscopic images L2 and R2 of the second scene are separated from each other by the image R1 of the first scene. This arrangement results in a great saving of space and economy of material.

Figure 21:
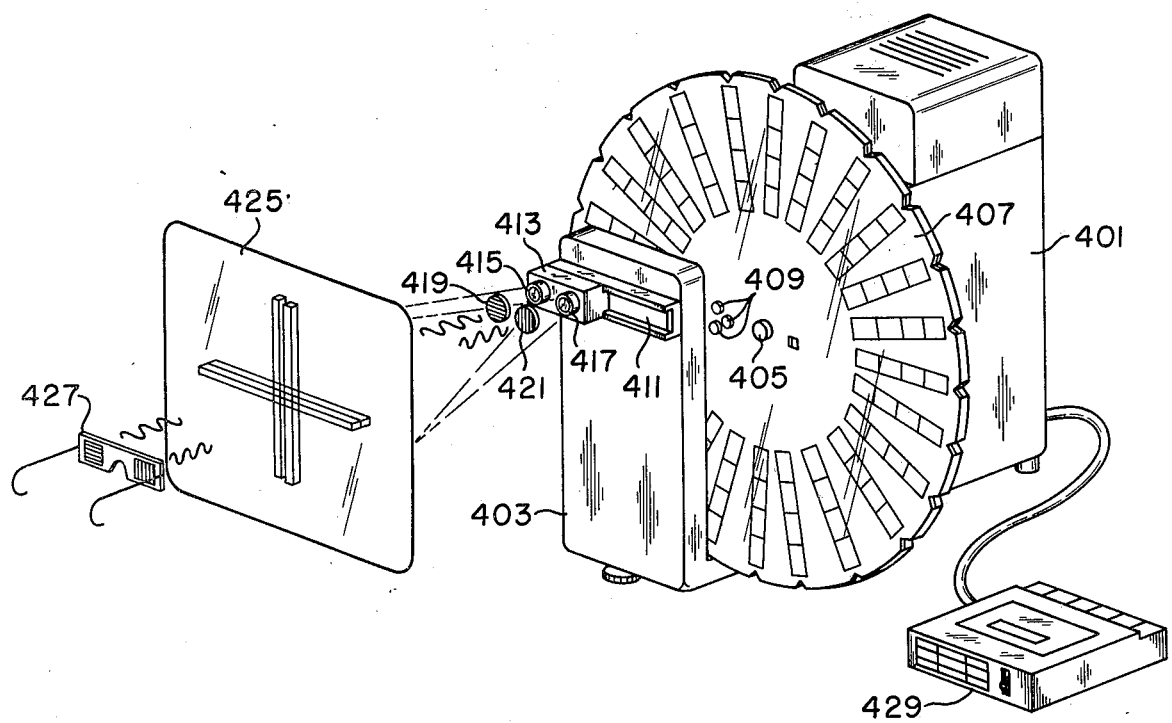

FIG. 21 shows schematically an automatic-audio system for projecting images from stereoscopic disks of the kind above described in connection with FIGS. 1 and 4. The projector has a rear section 401 and a front section 403, the rear section containing the usual conventional lamp, reflector, and condenser lens, not shown because all of these parts are conventional and well known.

The rear section 401 also contains a conventional step-by-step motor mechanism (not shown) having an arbor shaft 405 projecting forwardly with its axis parallel to the optical axis of the projector. On this arbor shaft is mounted the stereoscopic image disk 407, which may be identical with the image disk disclosed in connection with FIGS. 1 and 4. There is a hub on the arbor shaft 405, not shown but just behind the disk 407 in FIG. 21, this hub being similar, for example, to the hub 125 in FIG. 8 except that, instead of having the square drive pin 127 of FIG. 8, it has a cluster of three drive pins 409 (FIG. 21) which fit into the cluster of three holes 36 shown in FIG. 4. As the arbor and hub turn, the cluster of pins 409 extending forwardly through the disk served to turn the disk with the arbor and hub, bringing one after another of the radial rows of stereoscopic images into the beam of light produced by the condenser lens of the projector.

A single drive pin, such as the pin 127 (FIG. 8) engaged in a single hole such as the hole 35 (FIG. 4) in the stereoscopic disk would serve to drive the disk so far as the mere mechanical drive function is concerned. However, for psychological reasons, it is preferred that the projector have the three drive pins 409 fitting in the three holes 36 of the disk, because the use of three drive pins brings to mind and emphasizes the three-dimensional nature of the projector and the three-dimensional picture which results from the use of this stereoscopic projector with the stereoscopic disk.

On the front section 403 of the projector there is a laterally extending track or guideway 411 along which slides a carrier 413 for the conventional projection lenses 415 and 417. These projection lenses are conventional except that they are mounted with polarizing filters 419 and 421, also conventional in themselves, one of which polarizes the projected beam of light in a horizontal plane and the other of which polarizes the projected beam in a vertical plane, as indicated schematically by the wavy lines. The stereoscopic pair of pictures illuminated by the projection lamp and condenser lens which happen at the moment to be aligned with the projection lenses 415 and 417 are projected by these projection lenses and through the polarizing filters onto the rear of the translucent projection screen 425, and are observed from the front by persons wearing conventional polarizing spectacles indicated schematically at 427.

When the projection lens carrier 413 is in the position shown in FIG. 21, at the left end of its track or guideway 411, the projection lenses 415 and 417 will be aligned with the outer series or set of stereoscopic images on the disk, and will project, for example, pairs of images such as L2 and R2 or L4 and R4 in FIG. 1. When the projection lens carrier 413 is moved to the right end of its guideway 411, it will then be in position to project the inner set or series of stereoscopic pairs, such as L1 and R1, L3 and R3, etc.

The conventional step-by-step motor which turns the arbor 405 and its hub one step at a time may be similar to the motors customarily used, for example, in step-by-step turning of circular ring type slide magazines in still picture slide projectors. Notches or inaudible blurps are incorporated into the audio tape cassettes that fit in playback mechanism 429. These notches or blurps serve to time the shifting of the disks by the motor, through conventional circuitry. The playback unit 429 also serves to amplify and feed the audio from the cassette tape into auditorium type speakers that are conventional and are not shown.

Figure 22:
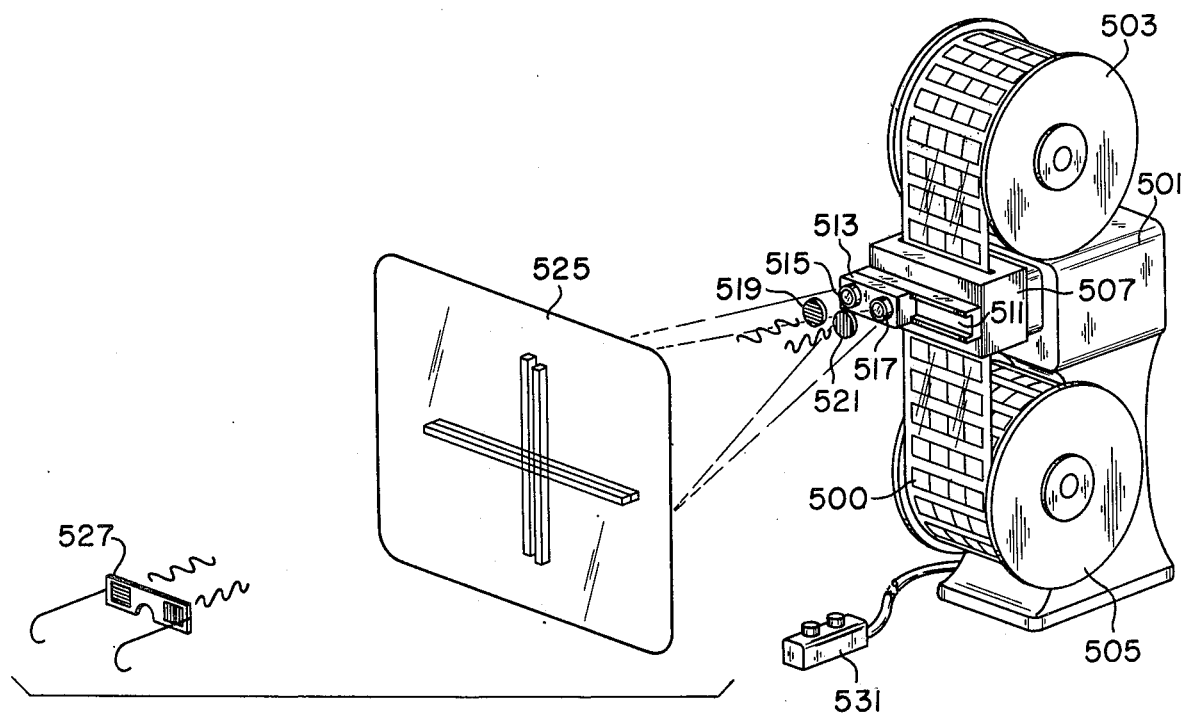
FIGS. 21 and 22 are perspective views of projection systems for projecting stereoscopic images from disks and from wide film strips, respectively.

FIG. 22 shows schematically a projector system for projecting stereoscopic images from wide roll film of the kind described in connection with FIG. 19. The projector body is indicated in general at 501, and contains the usual conventional lamp, reflector, and condenser lens. The body carries suitable brackets and bearings for supporting two film reels 503 and 505, either one of which may be regarded as the film supply reel or spool, and the other as the film take-up reel or spool.

A forward extension 507 on the body has a vertical slot through which the film is threaded, and on the front of this body is a laterally extending track 511 for supporting the projection lens carrier 513 on which are mounted the projection lenses 515 and 517 with their associated polarizing filters 519 and 521.

The action of these parts is substantially the same as that of the parts numbered 411 to 421, inclusive, in FIG. 21. When the carrier 513 is at the left end of its track 511, it projects the illuminated stereoscopic pairs of the left-hand series or set on the strip film 500, such as images L1 and R1 in FIG. 19. If the projection lens carrier 513 is moved along the track 511 to its righthand position, it will then project the illuminated images of the righthand set of pairs of stereoscopic images, such as those marked L2 and R2 in FIG. 19. The images are projected onto the rear of the translucent screen 525, where they are viewed by observers through polarizing spectacles 527, just as in the case of FIG. 21.

Preferably there is one step-by-step motor connected with each of the reels 503 and 505, or else a single motor connected alternatively to both reels through a clutch system, so that by suitable operation of the conventional remote control cord or cable shown schematically at 531 the lecturer standing by the screen can cause the film to be advance step-by-step either upwardly or downwardly, for initial viewing in one direction or for reviewing images already seen a moment earlier.

It has been indicated above that it is advisable not to have any light illuminating the images at the time they are moved from one position to the next position, in order to eliminate any eye strain which may be caused by looking at illuminated images when they are moved. This result may be accomplished in two ways. First, the source of illumination may be actually turned off, as by the above mentioned electric switch mechanism 163, 165, 167 controlled by the notches 161 on the periphery of the disk, in those embodiments of the invention in which the images are carried by a disk, or by similar notches (not shown) in the edges of the wide film strip, in those embodiments using such a film strip. Second, while leaving the light on instead of turning it off, a shutter may be closed across the field of view of each eye piece, to block out the view as the illuminated disk turns. The opening and closing of the shutter may be accomplished by an electromagnet or solenoid operated by the same switch mechanism 163, 165, 167 which is wired up to operate the shutter instead of operating the illumination.

In FIG. 4 there is shown a series of small holes 175 extending through the disk near the outer edge thereof, in the spaces between successive radial rows of stereoscopic images, and outwardly of the outer circle of key indications 173. These small holes 175 are optional, and when used, they may be provided for controlling a light beam which, in turn, through a suitable conventional photo-sensitive cell, stops the turning of the disk from one position to the next successive position. Or again, the interruption of a light beam when the disk turns and the reestablishment of the light beam through one of the holes 175 when the disk reaches the next position may be used to control the starting and stopping of audio apparatus, such as a magnetic tape, which gives an audible message related to the display of the stereoscopic pictures.

It has been mentioned that compressed air is the preferred form of motive power for turning the disks in the embodiment illustrated in FIGS. 12-18. However, it is within the scope of the invention to use solenoids or electro magnets in place of the air cylinders illustrated in FIGS. 17 and 18. It is also contemplated to use electric motors. If the separate disks in this embodiment (FIGS. 12-18) are to be mounted for upward and downwward movement as in the present illustrations, to accommodate people of widely different height, a separate electric motor in each of the upwardly and downwardly movable cabinets 261 is advisable. If, however, the feature of accommodating people of different height is eliminated and the various disks are mounted in stationary cabinets, then a single motor of larger capacity could be used, driving a shaft extending through the whole length of the mechanism from one end to the other, with power take-off at intervals along the shaft, by gears or belts, for driving the individual disks through their step-by-step turning movements.

In connection with the projectors illustrated in FIGS. 21 and 22, it has been mentioned above that the projection lens carriers 413 and 513 are movable laterally to align the projection lenses with one or the other groups of stereoscopic pairs of images on the disk or the wide film strip, as the case may be. However, it is within the scope of the invention to omit the feature of lateral movement of the projection lenses, and to provide, instead, for lateral mechanical movement of the entire disk or the entire film strip, in order to bring stereoscopic pairs of images from the selected group of images into line with the projection lenses.

The use of the automatic audio stereoscopic color sequences as produced by the mechanism disclosed in FIG. 21 will achieve more conviction in the teaching of all of the solid sciences, such as microbiology, botany, geology, surgery, architecture, etc., it is believed, than conventional teaching techniques heretofore used.

The precision aligned stereoscopic sequences sandwiched within rugged, rigid disks are engineered to function for two purposes: (1) for projection, preferably from hidden mechanisms; and/or (2) for additional reviewing in automatic, solo or duo viewing stations, similar to that shown in FIG. 5. In one advantageous method of use, the truthful color stereo sequence disks are projected onto a screen to be seen by seated students. Immediately after the authoritative type lectures, duplicate stereo pictorial disks with related audio cassettes are inserted into either solo or side-by-side duo automatic audio viewing stations located in the school's library and/or in dormitory halls, available for day and night reviewing. These reviewing stations may be similar to FIG. 5, plus binaural speakers like those shown at 303, 305 in FIG. 12.

The dual pairs of stereograms on a single roll of film have valuable potentials for use as stereoscopic motion pictures. The insertion of rolls of wide film into a custom built projector eliminates serious synchronation problems that happen when rolls of left eye images are projected from one projector and the right eye images have to be projected from a second projector. The 5½ inch wide rolls bear larger images then those four sprocket hole high images that are currently being used in theatrical installations. Further patent applications will present more details.

What is claimed is:

1. A stereoscopic viewing system useful especially in sales promotion and in instruction, comprising two separate carrier means which are substantially duplicates of each other, each having thereon a multiplicity of pairs of stereoscopically related images, cabinet means enclosing said carrier means, two separate binocular viewing means mounted on said cabinet means and arranged so that one person placing his eyes at one of said viewing means may observe a pair of stereoscopically related images on one of said carrier means while another person placing his eyes at the other of said viewing means may simultaneously observe a duplicate pair of stereoscopically related images on the other of said carrier means, each of said separate carrier means comprising a relatively easily removable and replaceable image-bearing unit in the form of an approximately circular disk having substantially radial rows of images, each radial row containing, on a single radial line from the center of the disk to an outer edge thereof, not less than two pairs of stereoscopically related images with one image of each pair located between two images of another pair on the same radial row, the binocular viewing means being mounted on an upright wall of said cabinet means, and said cabinet means being shaped to provide knee space beneath said upright wall, so that two persons such as, for example, an instructor and a pupil, or a salesman and a customer, or two customers, may be seated side by side in front of and facing said cabinet means and while thus seated may observe the stereoscopic images on the respective image-bearing units through the respective binocular viewing means, manually controlled means for simultaneously turning both of said disks to bring a fresh radial line of images thereon into alignment with said binocular viewing means, and manually controlled means for causing a simultaneous relative shift of the relative positions of the binocular viewing means and their respective disks in a direction radially of the disks to cause different pairs of stereoscopic images on the same radial lines to be simultaneously brought into view of the two observers using the two binocular viewing means.

2. The invention defined in claim 1, further comprising binaural sound reproducer means associated with each binocular viewing means in a position close to both ears of a person looking through the binocular viewing means.

3. The invention defined in claim 1, further comprising image illuminating means within said cabinet means, said illuminating means being shiftable from a position providing illumination behind the images when the images are transparencies to a position illuminating the front surfaces of the images when the images are opaque.

4. The invention defined in claim 1, further comprising illuminating means in said cabinet means for illuminating the images on said disks, and control means responsive to rotation of one of said disks for rendering said illuminating means ineffective while said disk is turning from one observation position to the next observation position, and for rendering said illuminating means effective when said disk reaches an observation position.

5. The invention defined in claim 4, wherein said control means includes a series of circumferentially spaced notches on said one of said disks, and an electric switch having a feeler arm responsive to said notches.

6. The invention defined in claim 1, further comprising key indication means for enabling a third person to tell what images are optically aligned with the two binocular viewing means being used by the two other persons.

7. The invention defined in claim 6, wherein said key indication means comprises a series of key indications on each carrier unit, one indication associated with each pair of stereoscopic images, and a key observation opening for enabling a third person to see the key indications.

8. The invention defined in claim 7, wherein said carrier units are in the form of rotatable disks having angularly spaced radial rows of images with two pairs of stereoscopically related images on each row, and wherein the key indications on at least one of said disks include an indication adjacent one end of each radial row.

9. The invention defined in claim 8, wherein the key indication adjacent each radial row refers to and identifies an image on a different radial row at a substantial angle to the radial row where the key indication is located.

10. The invention defined in claim 7, wherein said carrier units are in the form of rotatable disks having angularly spaced radial rows of images with two pairs of stereoscopically related images on each row, and wherein the key indications on at least one of said disks include an indication in each space between the outer ends successive radial rows of images.

11. The invention defined in claim 7, wherein said carrier units are in the form of rotatable disks having angularly spaced radial rows of images with two pairs of stereoscopically related images on each row, and wherein the key indications on at least one of said disks include an indication adjacent the inner end of each radial row and in radial alignment therewith, for identifying one pair of stereoscopic images on a different radial row, and a second key indication adjacent the outer end of each radial row but offset circumferentially with respect to such row, for identifying the other pair of stereoscopic images on said different radial row.

12. The invention defined in claim 11, wherein said key observation opening includes an observation opening at one radial distance from a center of rotation of said one of said disks for observing the key indications at the inner end of each radial row and a second observation opening at a different radial distance from said center of rotation for observing the key indications between the outer ends of successive radial rows.

13. The invention defined in claim 1, wherein said cabinet means, carrier means, and viewing means are of such size and arrangement as to accommodate at least two persons side by side on one side of said cabinet means simultaneously using said viewing means to view stereoscopic images on carrier means within said cabinet means, and to accommodate simultaneously therewith at least two other persons side by side on the opposite side of said cabinet means simultaneously using said viewing means to view stereoscopic images on carrier means within said cabinet means.

14. The invention defined in claim 13, wherein said advancing means includes means manually operable by the viewing persons on one side of the cabinet means for advancing the carrier means which they are viewing independently of the advance of the carrier means being viewed by the viewing persons on the opposite side of the cabinet means.

15. A stereoscopic viewing system useful both in sales promotion and in instruction, comprising cabinet means, binocular viewing means mounted on said cabinet means, a stereoscopic image carrier unit movably mounted within said cabinet means and containing a series of pairs of stereoscopically related images which may be successively brought into viewing position optically aligned with said binocular viewing means by moving said carrier unit, and key indication means for enabling a second person to tell which pair of images is optically aligned with the binocular viewing means at any given moment without interfering with viewing through such binocular viewing means by a first person, said key indication means including a series of key indications on said carrier unit in predetermined relation to the series of pairs of images on the same carrier unit, and a key observation opening in said cabinet means for enabling the second person to see a key indication on the carrier unit.

16. The invention defined in claim 15, wherein said carrier unit is in the form of a rotatable disk having angularly spaced radial rows of images with two pairs of stereoscopically related images on each radial row, and wherein there is a key indication adjacent each radial row for identifying an image on a different radial row at a substantial angle to the radial row where the key indication is located.

17. A stereoscopic image carrier in the form of a substantially circular disk having pairs of stereoscopic images arranged along radial rows, each radial row containing four images constituting two pairs of images on the same radial line from the center of the disk to one outer edge.

18. The invention defined in claim 17, wherein said circular disk has a circumferentially extending series of small holes (175), one associated with each of said radial rows of images, arranged so that a control beam of light may pass through successive holes as said disk rotates from one viewing position to another.

19. The invention defined in claim 17, wherein said carrier is in the form of an approximately circular disk having a body layer of relatively stiff opaque sheet material with appropriate window openings therein, all of the images of all of the stereoscopic pairs on the same disk being images formed photographically on a single unitary piece of photographic film mounted on and carried by said stiff body layer of said carrier.

20. The invention defined in claim 17 wherein one image of each stereoscopic pair is located between the two images of a different pair of stereoscopic images on the same radial row.

21. The invention defined in claim 20 wherein the two images of each stereoscopic pair are located at approximately adult human interpupillary distance from each other.

22. The invention defined in claim 17, wherein the stereoscopic images of each pair may be used either for direct viewing or for projection onto a viewing screen, and wherein the two images of each pair on the carrier have sufficient accuracy of alignment and placement relative to each other to avoid eye strain when viewing enlarged projected images thereof on a viewing screen.

23. A projector for projecting images from an image carrying disk to a viewing screen, said projector including a rotary hub having an arbor on which said disk may be impaled and a radial shoulder for engaging a portion of the disk mounted on the arbor and driving means projecting from said shoulder, said disk also having a special opening for receiving said driving means to maintain said disk in predetermined orientation relative to the projector hub, the driving means on the projector hub and the special opening in the disk for receiving the same being of different shape from said drive pin and said drive pin receiving opening, respectively.

24. The invention defined in claim 23, wherein said special opening in said disk is a cluster of three holes to signify the three-dimensional stereoscopic effect which may be produced by projecting stereoscopic pictures from the disk, and wherein said driving means includes a cluster of three pins to engage in said three holes when the disk is mounted on the arbor of the projector hub.

25. The invention defined in claim 23, wherein said circular disk has at least two pairs of stereoscopic images on each radial row, and wherein said projector includes projection lens means shiftable radially with respect to the projector hub arbor to determine which pair of stereoscopic images on a radial row will be projected.

26. The method of arousing interest in and promoting potential sale of items, which comprises the steps of providing a series of pairs of stereoscopic pictures of the items to be promoted, preparing two image carriers each having images of said stereoscopic pictures thereon, the images on one carrier being substantially duplicates of the images on the other image carrier, providing two observation stations which may be occupied respectively by two persons in approximately side by side relation to each other, providing stereoscopic viewing means at each of said stations, placing one of said image carriers in such position that images thereon may be viewed stereoscopically by a person at one of said observation stations, placing the other of said image carriers in such position that images thereon may be viewed stereoscopically by a person at the other of said observation stations, advancing both of said image carriers simultaneously in such relation to each other that two persons at the two observation stations will be seeing substantially duplicate images at any given time, and providing observation means other than said stereoscopic viewing means, whereby a third person such as a salesman may learn which stereoscopic images are being observed at any given time by the two persons at the two viewing stations, without disturbing such persons.

* * * * *